US011987944B2

(12) United States Patent
Knapp et al.

(10) Patent No.: US 11,987,944 B2
(45) Date of Patent: May 21, 2024

(54) MAT WASHER

(71) Applicant: Mud Monster Matting Corp., Cochrane (CA)

(72) Inventors: Colin Knapp, Cochrane (CA); Shane Trowbridge, Cochrane (CA); Daniel Page, Cochrane (CA)

(73) Assignee: Mud Monster Matting Corp., Cochrane (CA)

(*) Notice: Subject to any disclaimer, the term of this patent is extended or adjusted under 35 U.S.C. 154(b) by 759 days.

(21) Appl. No.: 16/727,156

(22) Filed: Dec. 26, 2019

(65) Prior Publication Data

US 2020/0224379 A1 Jul. 16, 2020

Related U.S. Application Data

(60) Provisional application No. 62/924,677, filed on Oct. 22, 2019, provisional application No. 62/849,499, filed on May 17, 2019, provisional application No. 62/785,943, filed on Dec. 28, 2018.

(51) Int. Cl.
*E01H 1/00* (2006.01)
*B08B 3/02* (2006.01)
*B08B 3/04* (2006.01)

(52) U.S. Cl.
CPC ............. *E01H 1/005* (2013.01); *B08B 3/022* (2013.01); *B08B 3/041* (2013.01)

(58) Field of Classification Search
CPC .......... B08B 3/022; B08B 3/041; B08B 1/02; E01H 1/005
See application file for complete search history.

(56) References Cited

U.S. PATENT DOCUMENTS 5,372,153 A * 12/1994 Dobson .................. B08B 3/022 134/107
6,129,099 A * 10/2000 Foster ....................... B08B 1/02 134/131

(Continued)

FOREIGN PATENT DOCUMENTS

CA 3 012 208 A1 1/2020
DE 102017206659 A1 * 10/2018 .............. B08B 1/02
KR 100990391 B1 * 10/2010

OTHER PUBLICATIONS

DE102017206659—Machine Translation (Year: 2018).*
KR100990391—Machine Translation (Year: 2010).*

*Primary Examiner* — Marc Lorenzi
(74) *Attorney, Agent, or Firm* — The Dobrusin Law Firm, PC

(57) ABSTRACT

A mat washer includes: a body adapted for highway transport; a loading platform adapted to receive a stacked pair of mats from, for example, a forklift, and adapted to pivot the pair of mats to an upright position; a splitter adapted to receive the mats from the loading platform and to separate the mats from one another; a transporter adapted to transport each of the mats longitudinally relative to the body from the splitter; a uniter adapted to receive the mats from the transporter and urge them together; an unloading platform adapted to receive the pair of mats from the uniter and pivot them downwardly for retrieval by, for example, the forklift; and a washing facility disposed between the loading and the unloading platform and adapted to wash the mats.

5 Claims, 47 Drawing Sheets

(56) References Cited

U.S. PATENT DOCUMENTS

| | | | | |
|---|---|---|---|---|
| 2011/0030727 | A1 * | 2/2011 | Rubenzer | D06G 1/00 134/9 |
| 2013/0112229 | A1 * | 5/2013 | White | H02J 7/0068 134/62 |
| 2017/0259307 | A1 | 9/2017 | Francis et al. | |

* cited by examiner

MAT WASHER

FIELD

The invention relates to the field of mats, of the type used as temporary roads and for construction platforms.

BACKGROUND

It is well known to use mats for temporary roads and construction platforms. When the mat is no longer required, it is typically cleaned for storage and/or reuse.

SUMMARY

Forming one aspect of the invention is apparatus for use with mats, the apparatus comprising a body, a loading platform, a splitter, a transporter, a uniter, an unloading platforming and a washing facility.

The body is adapted for highway transport.

The loading platform has: (i) a longitudinal axis; (ii) a lowered position whereat the platform projects horizontally from the axis and beyond the body to permit receipt of a pair of the mats, one of the pair being disposed upon the platform and the other of the pair of mats being disposed upon the one of the mats; and (iii) a raised position whereat the platform projects upwardly from the axis; and is also adapted to pivot about the axis from the lowered position to the raised position in carriage of the pair of mats, to, in use, place the pair of mats at a transition position.

The splitter is adapted, when the platform is in the raised position and the pair of mats is at the transition position, to move the other of the mats laterally away from the one of the mats, to orient the pair of mats at an entry position.

The transporter is adapted, when the mats are at the entry position, to transport each of the mats longitudinally relative to the body to an exit position.

The uniter is adapted, when the mats are at the exit position, to move the other of the mats laterally towards the one of the mats, to orient the pair of mats at a staging position.

The unloading platform has: (i) a longitudinal axis; (ii) a raised position whereat the platform projects upwardly from the axis and, when the pair of mats are at the staging position, the pair of mats are disposed against the platform; and (iii) a lowered position whereat the platform projects horizontally from the axis and beyond the body; and is pivotable about the axis from the raised position to the lowered position to the feeding position in carriage of the pair of mats, to, in use, place the pair of mats at an unloading position whereat the one of the pair of mats is disposed upon the platform and the other of the pair of mats is disposed upon the one of the mats.

The washing facility is disposed between the loading and the unloading platform and adapted to wash the mats.

According to another aspect of the invention, the splitter can comprise a clamp and a shuttle. The clamp is associated with the loading platform and clamps the one of the pair of mats to the platform during movement of the mats to the entry position.

The shuttle, when the pair of mats is at the transition position and the clamp is engaged to the one of the mats, provides for said movement of the other of the mats laterally away from the one of the mats.

According to another aspect of the invention, the transporter can comprise:

for each of the pair of mats, a conveyor, the conveyor for the one of the pair of mats being sized and positioned such that, upon movement of the pair of mats to the transition position, the one of the mats rests upon the conveyor and such that, upon movement of the pair of mats by the conveyor to the exit position, the one of the mats is disposed immediately above the unloading platform; and the conveyor for the other of the pair of mats being sized and positioned such that, upon movement of the pair of mats to the entry position, the other of the mats rests upon the conveyor and such that, upon movement of the pair of mats by the conveyor to the staging position, the other of the mats is disposed immediately above the unloading platform.

According to another aspect, the transporter can further comprise a roller arrangement provided for each of the mats and stabilizing said each mat during movement from the entry to the exit position.

According to another aspect, the roller arrangements can have an extended position associated with movement of the mats from the entry to the exit position and a retracted position associated with movement of the mats to the entry position and from the exit position.

Further advantages, features and characteristics of the present invention will become apparent upon a review of the detailed description with reference to the appended drawings, the latter being briefly described hereinafter.

DETAILED DESCRIPTION

Figure 1:
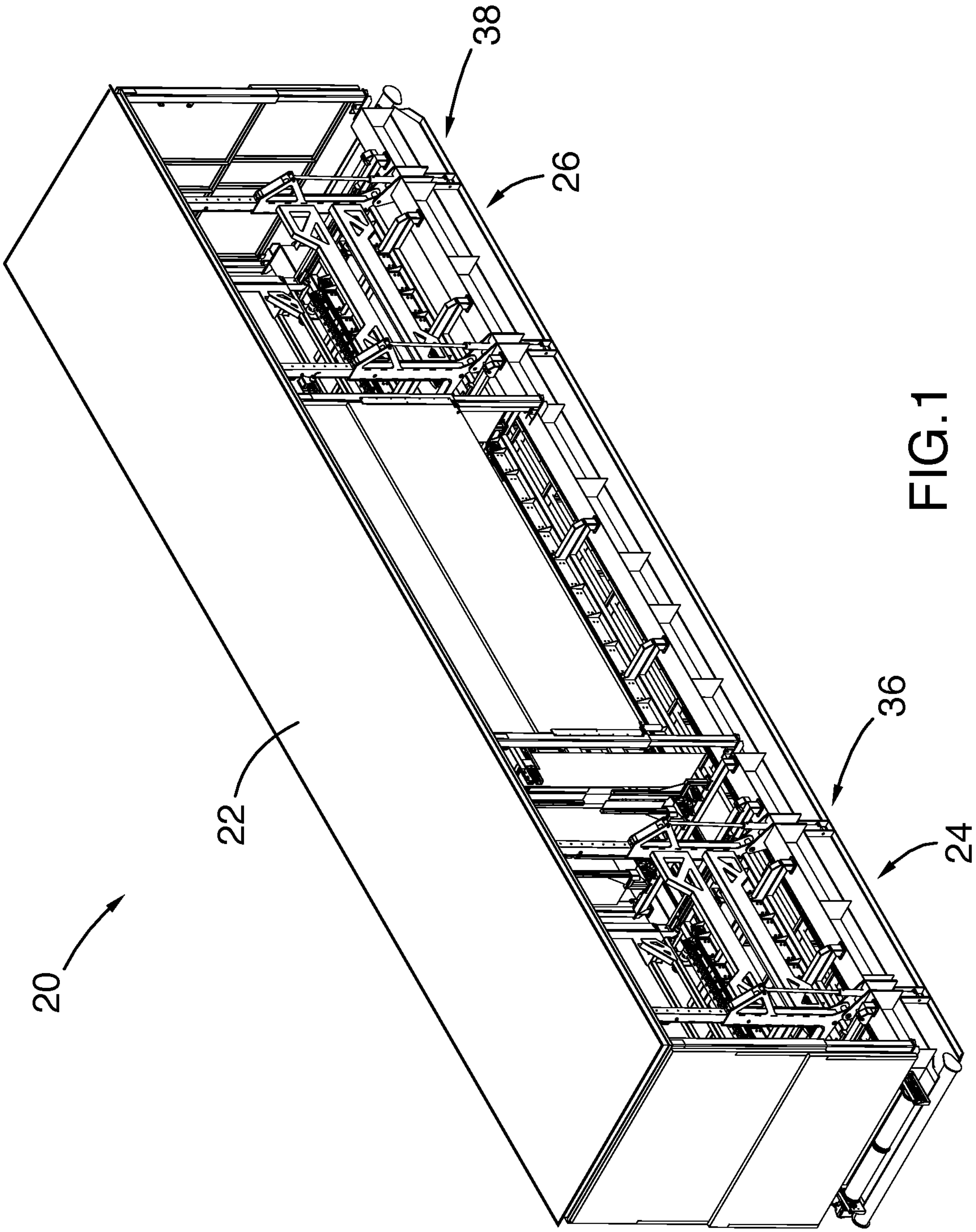
FIG. 1 is a perspective view of apparatus according to an exemplary embodiment of the invention.
Figure 1A:
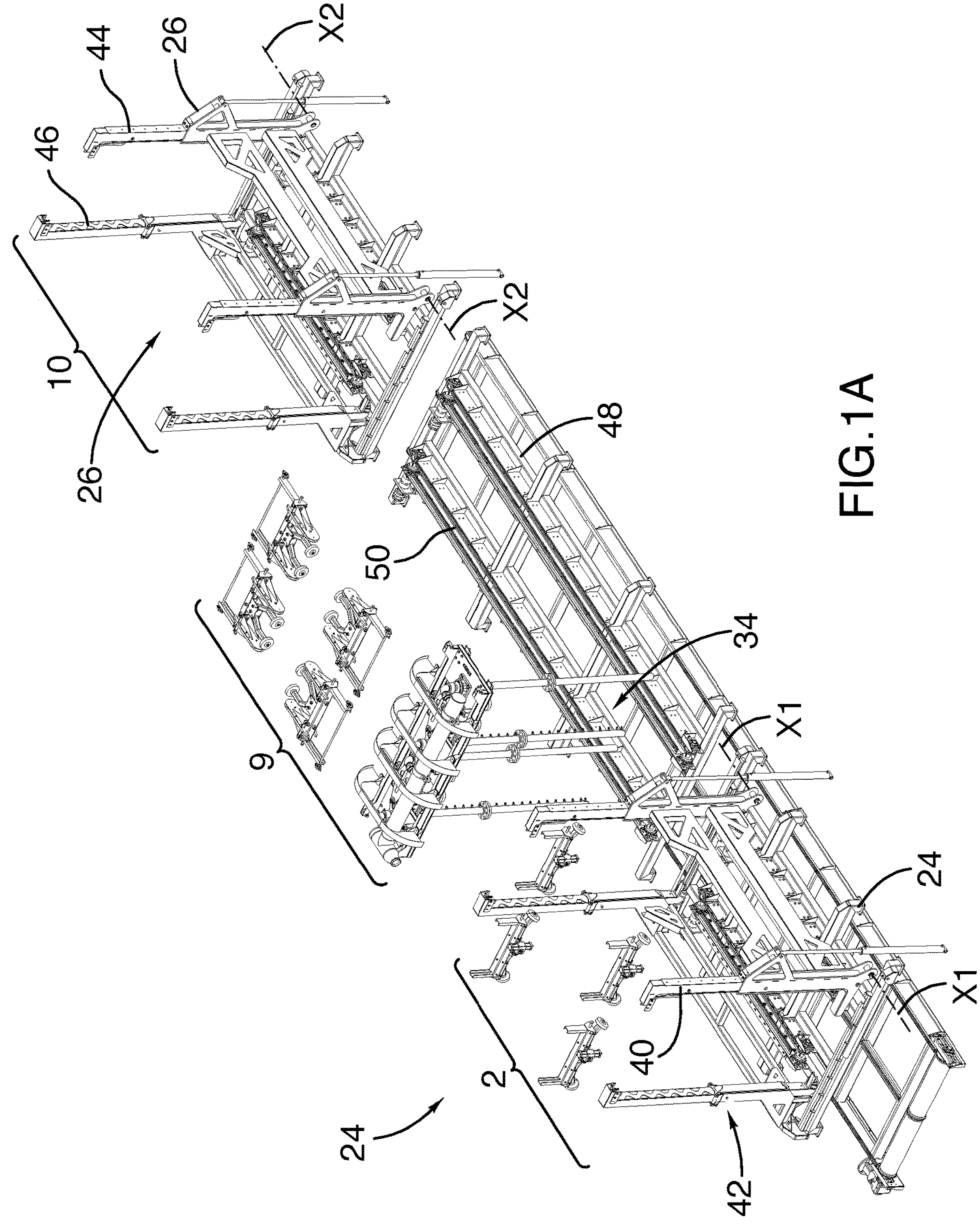
FIG. 1A is a view of the structure of FIG. 1, with portions removed for clarity.
Figure 2:
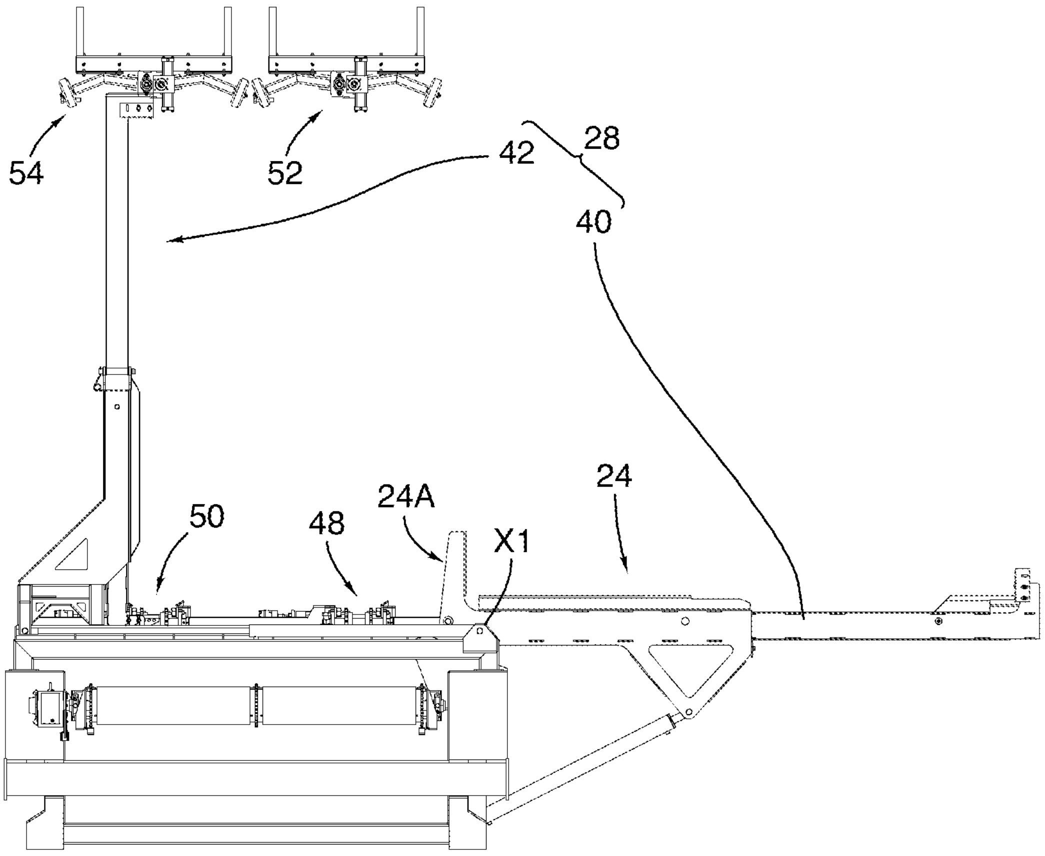
FIG. 2 is an end view of the structure of bracketed area 2 of FIG. 1A, with the unloading platform shown in the lowered position, the clamp disposed at the release position, the shuttle disposed at the retracted, lowered position, and the roller arrangements at the retracted positons.
Figure 9:
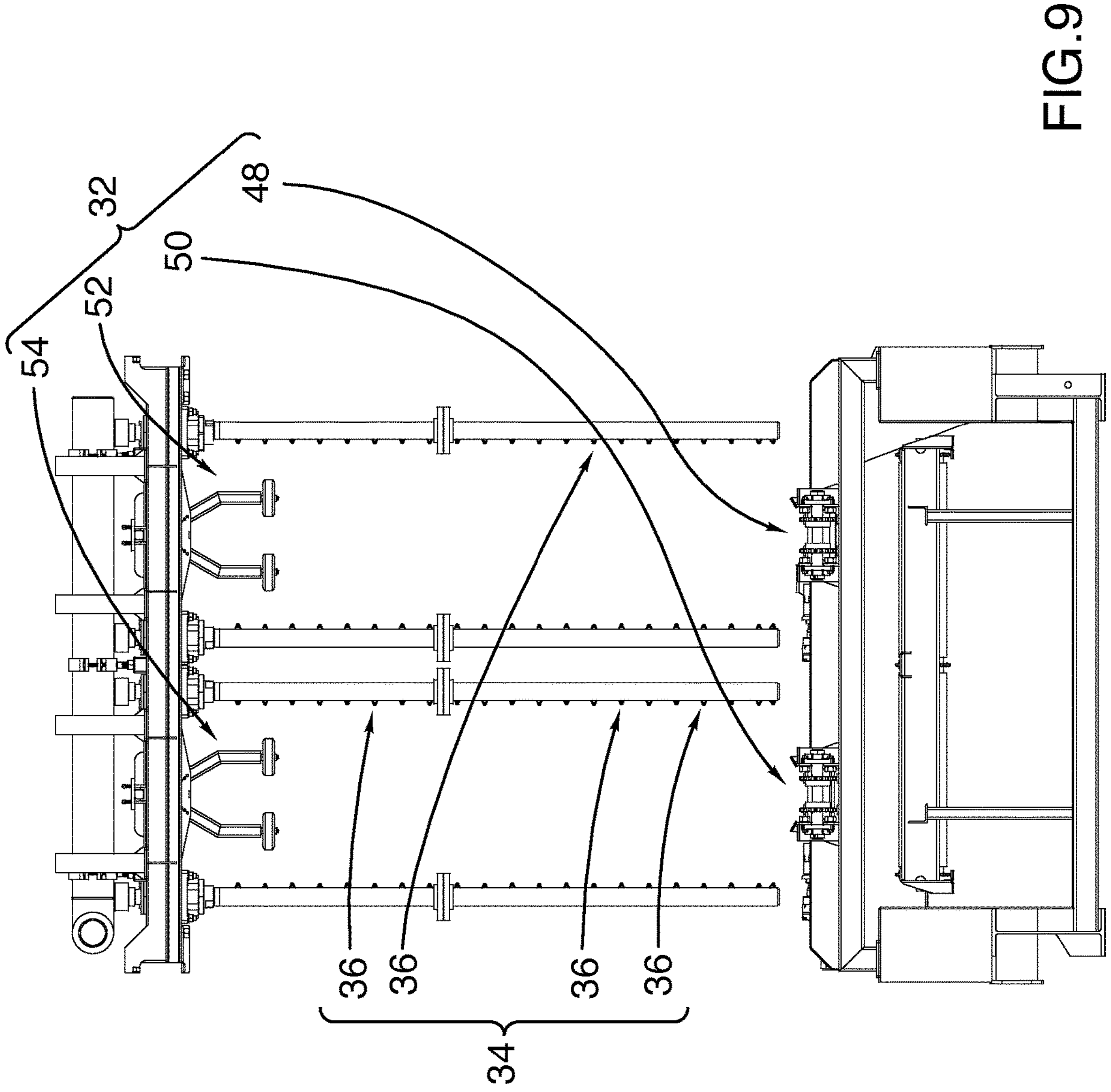
FIG. 9 is an end view of bracketed structure 9 of FIG. 1A.
Figure 10:
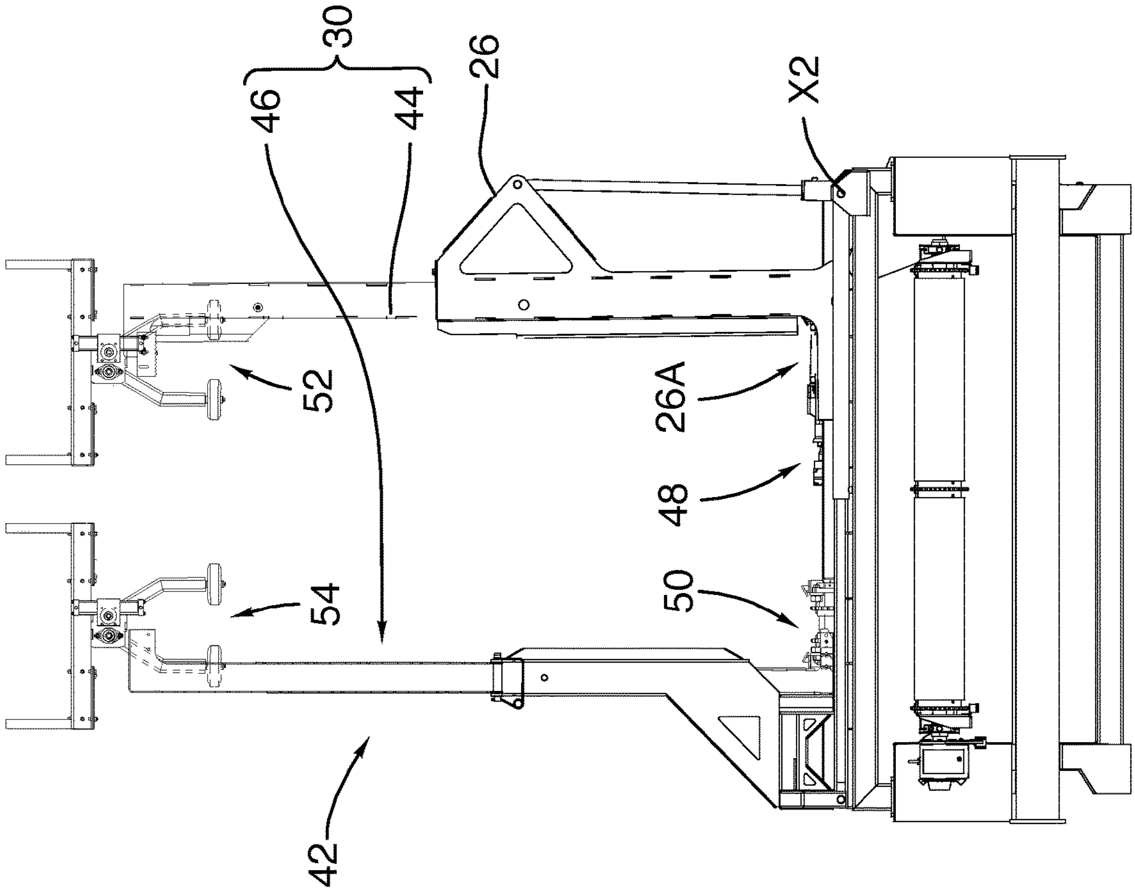
FIG. 10 is an end view of encircled structure 10 of FIG. 1A, with the clamp at the extended position, the shuttle at the retracted, lowered position and the roller arrangements at the extended positions.
Figure 38:
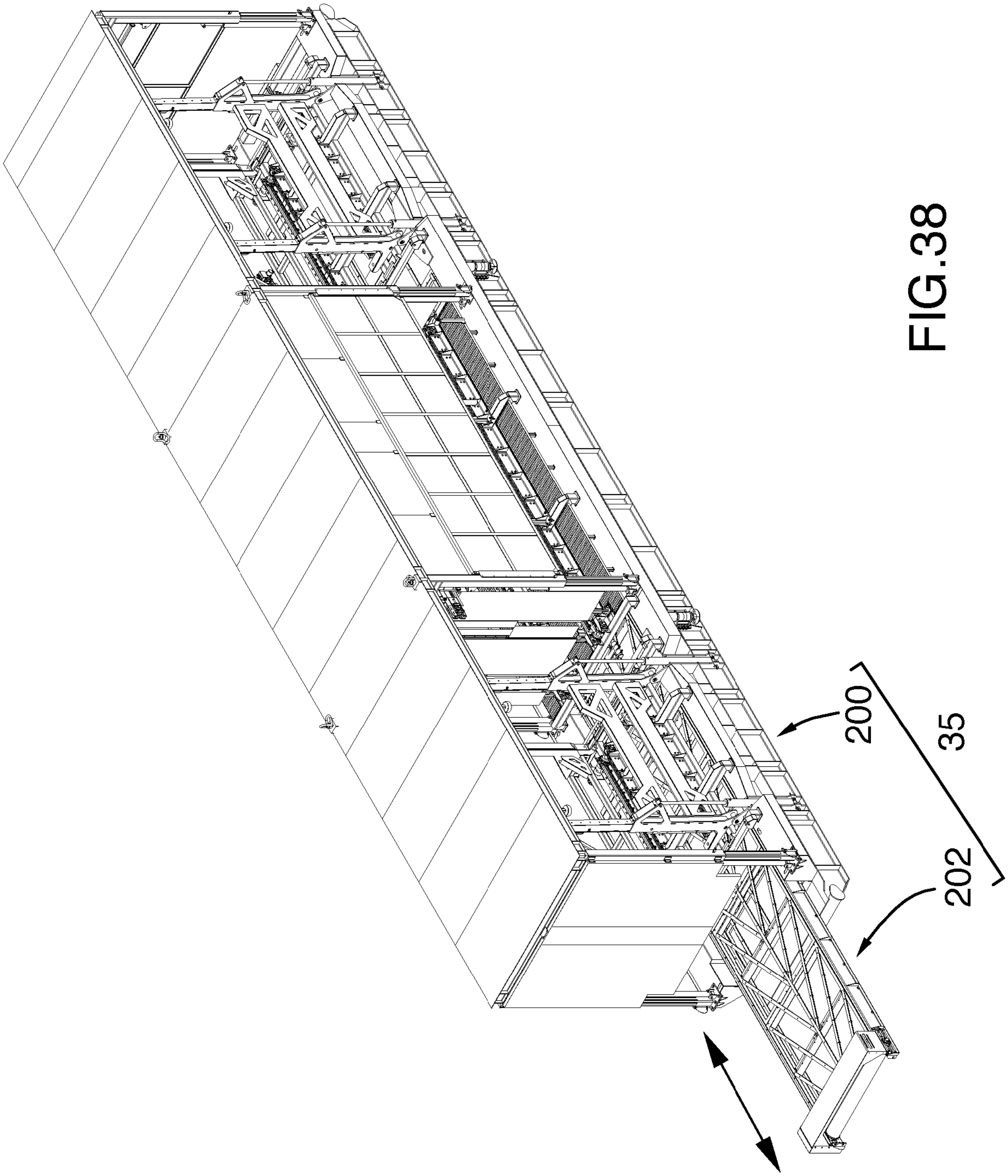
FIG. 38 is a view of the structure of FIG. 1 showing the conveyor in the extended position thereof.
Figure 39:
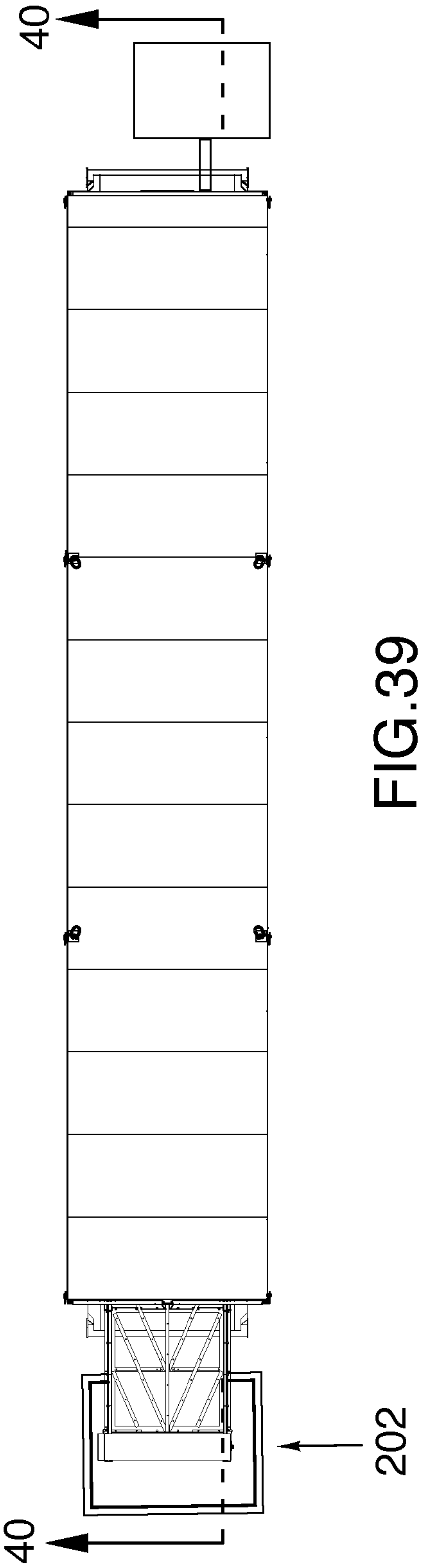
FIG. 39 is a plan view of the structure of FIG. 38.
Figure 40:
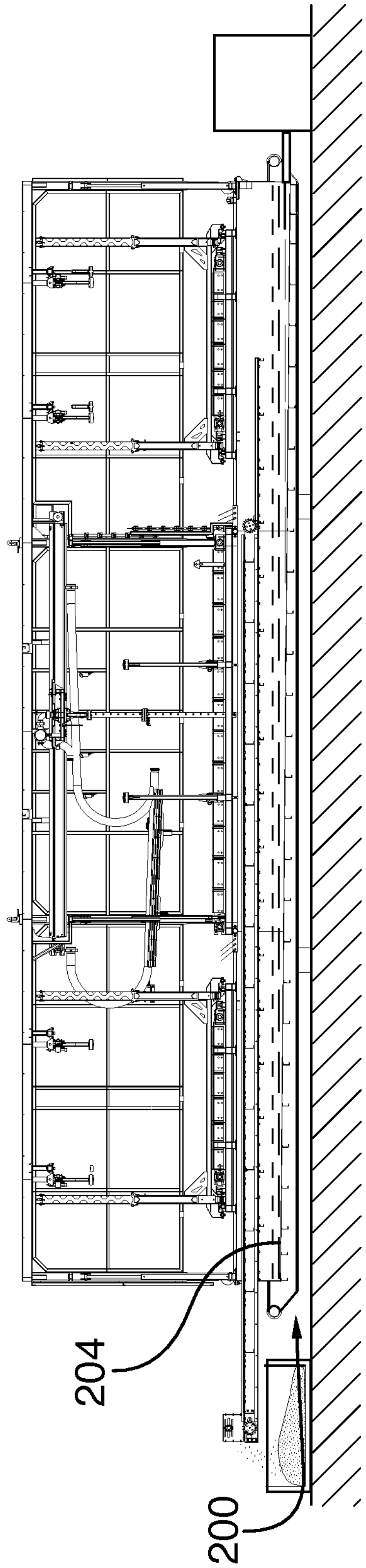
FIG. 40 is a view along section 40-40 of FIG. 39.

Apparatus 20 for use with mats is shown in FIGS. 1-16 and will be seen to comprise:

- as seen in FIG. 1, a body 22, a loading platform 24 and an unloading platform 26;
- as seen in FIG. 2, a splitter 28;
- as seen in FIG. 10, a uniter 30;
- as seen in FIG. 9, a transporter 32;
- as seen in FIG. 9 and FIGS. 34-37, a washing facility 34; and
- as seen in FIG. 38-40, a soil handling arrangement 35.

The body 22 will be seen to be constructed having the footprint of a standard shipping container and to have, at each end, an aperture 36, 38.

Figure 4:
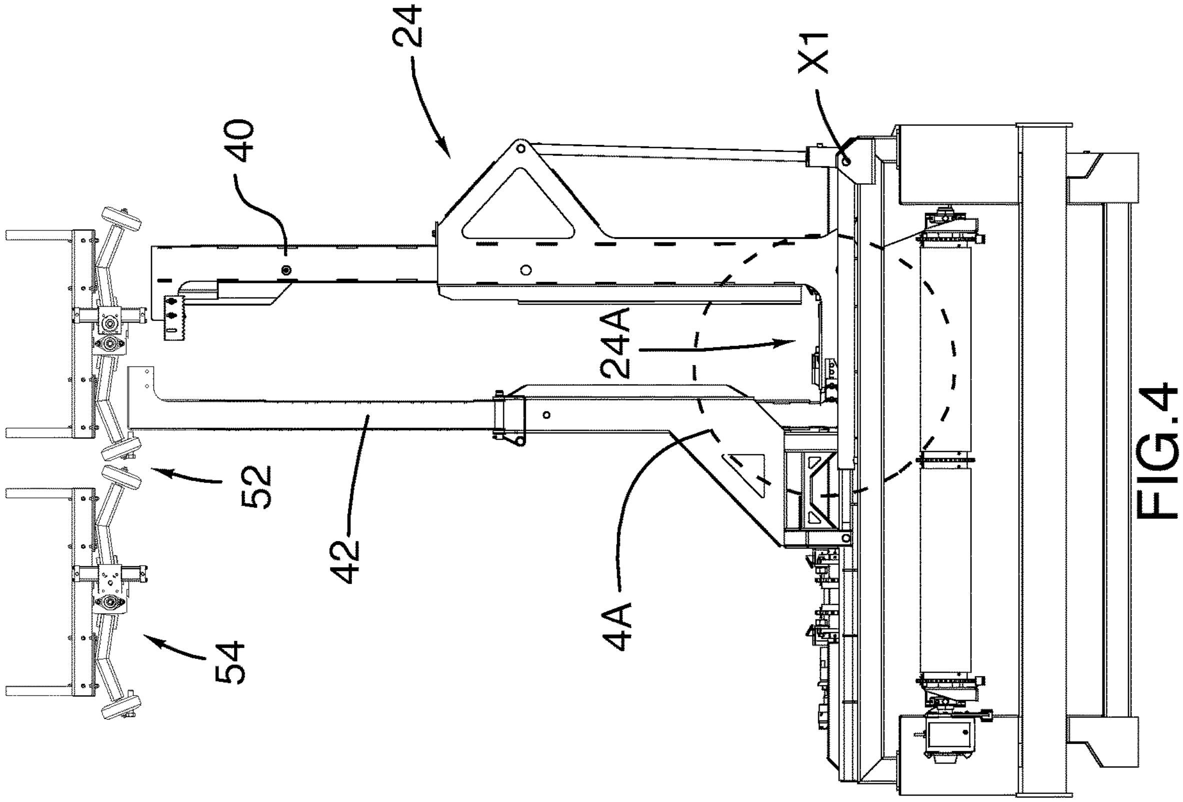
FIG. 4 is a view similar to FIG. 3, with the loading platform at the raised position and the shuttle at the extended, lowered position thereof.
Figure 4A:
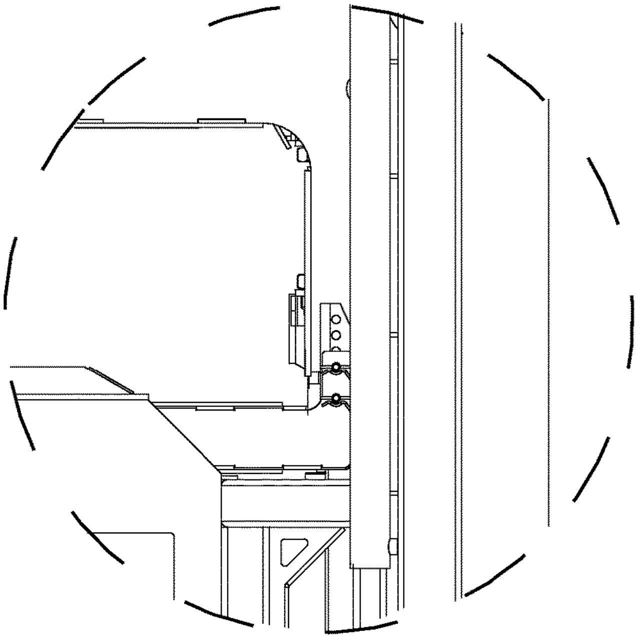
FIG. 4A is an enlarged view of the encircled structure of FIG. 4.

The loading platform has (i) a longitudinal axis X1-X1; (ii) a lowered position, as shown in FIG. 2, whereat the bulk of the platform projects horizontally from the axis, beyond the body (and through aperture 36, not shown); and (iii) a raised position, as shown in FIG. 4, whereat the bulk of the platform projects upwardly from the axis and will be understood to be adapted to pivot about the axis between the lowered position and the raised position. Loading platform 24 will also be understood to have a shoulder portion 24A which, in the lowered position, projects upwardly from the axis X1-X1 and, in the raised position, projects horizontally from the axis X1-X1.

Figure 14:
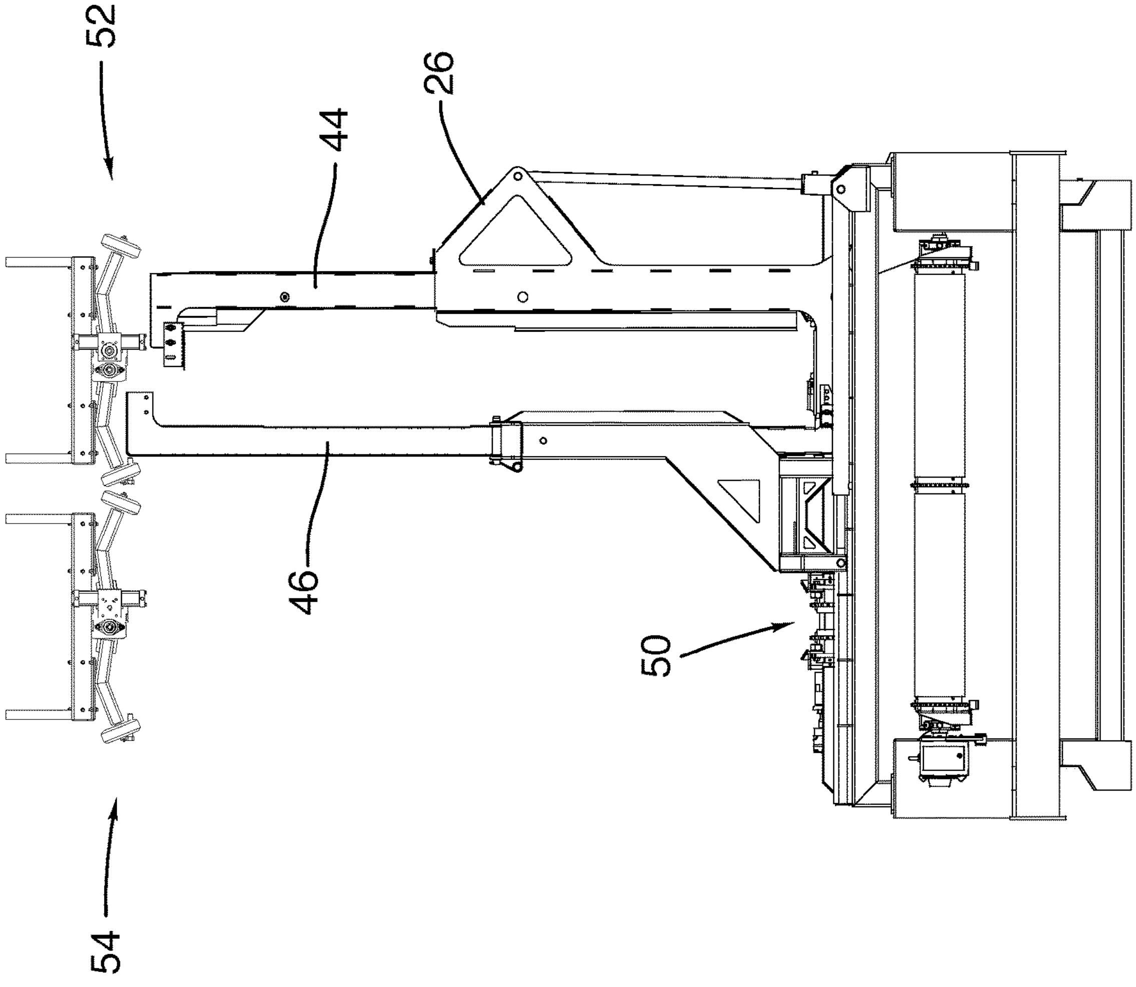
FIG. 14 is a view of the structure of FIG. 13, with the shuttle at the extended, lowered position.
Figure 15:
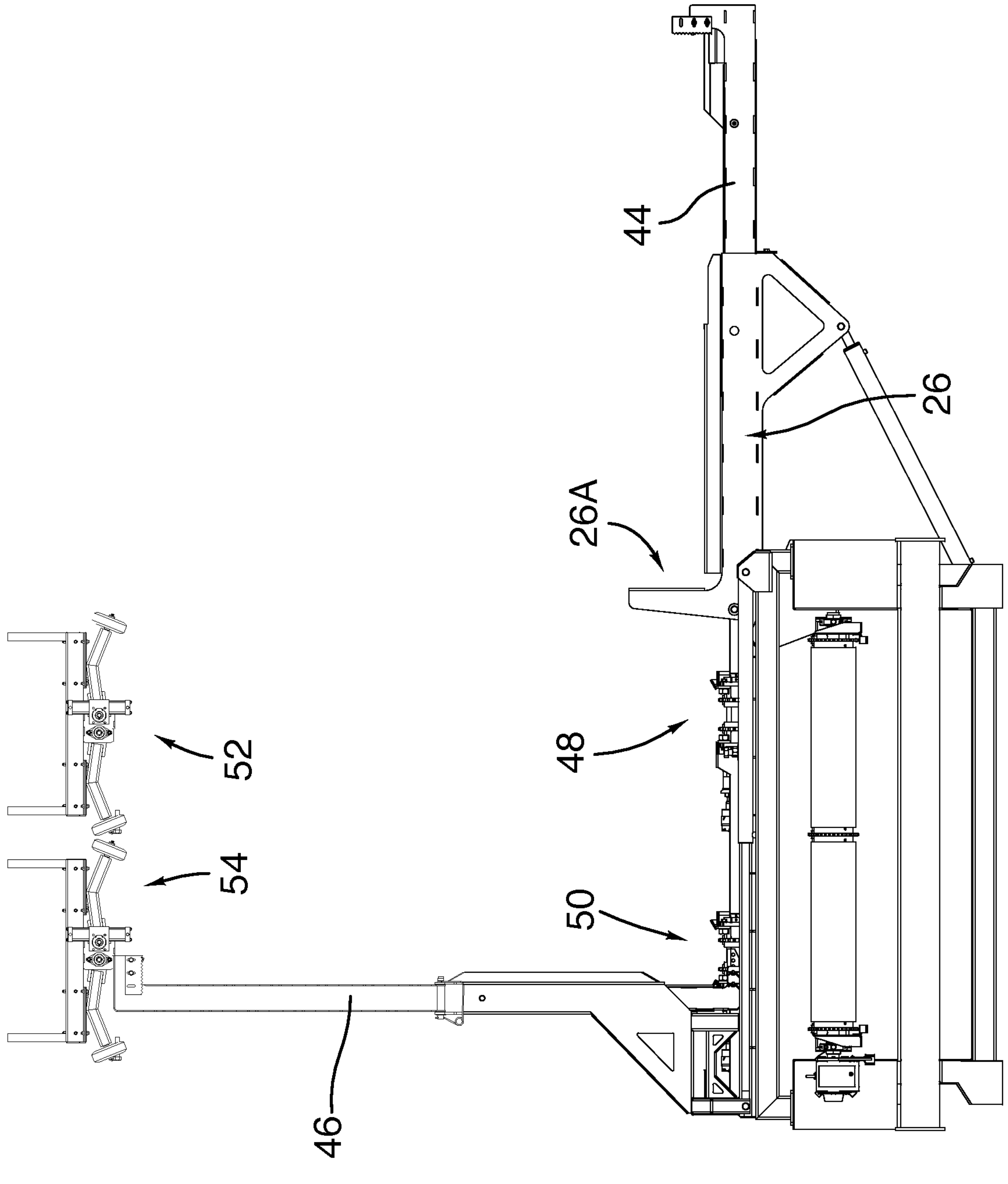
FIG. 15 is a view of the structure of FIG. 14, with the unloading platform at the lowered position.

The unloading platform has: (i) a longitudinal axis X2-X2; (ii) a lowered position whereat the bulk of the platform projects horizontally from the axis and beyond the body (and through the aperture 38, not shown) as shown in FIG. 15, and a raised position whereat the platform projects upwardly from the axis, as shown in FIG. 14 and will be understood to be adapted to pivot about the axis between the lowered position and the raised position.

Unloading platform 26 will also be understood to have a shoulder portion 26A which, in the lowered position, projects upwardly from the axis X2-X2 and, in the raised position, projects horizontally from axis X2-X2.

The splitter 28 comprises a clamp 40 and a shuttle 42.

Figure 3:
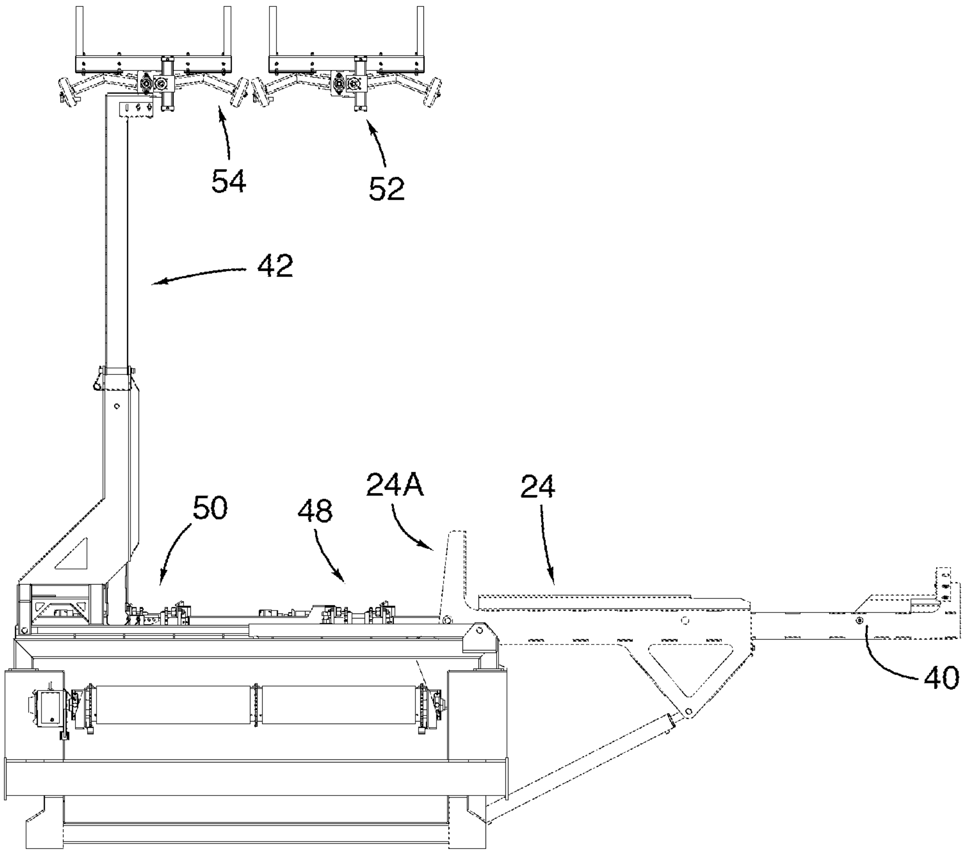
FIG. 3 is a view similar to FIG. 2, with the clamp disposed at the gripping position.

The clamp 40 is associated with, more particularly, mounted for telescopic movement relative to, the loading platform 24 and is movable between a release configuration shown in FIG. 2 and a gripping configuration shown in FIG. 3

Figure 5:
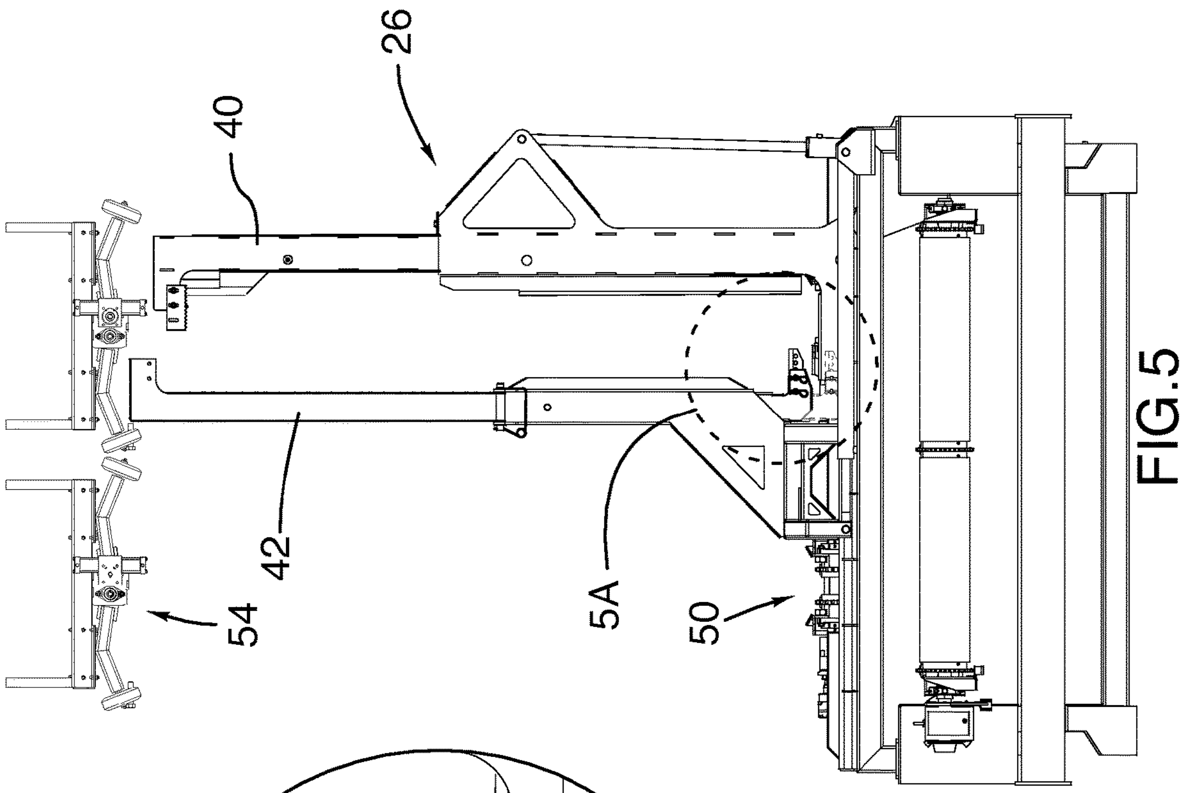
FIG. 5 is a view similar to FIG. 4, with the shuttle at the extended, raised position.
Figure 5A:
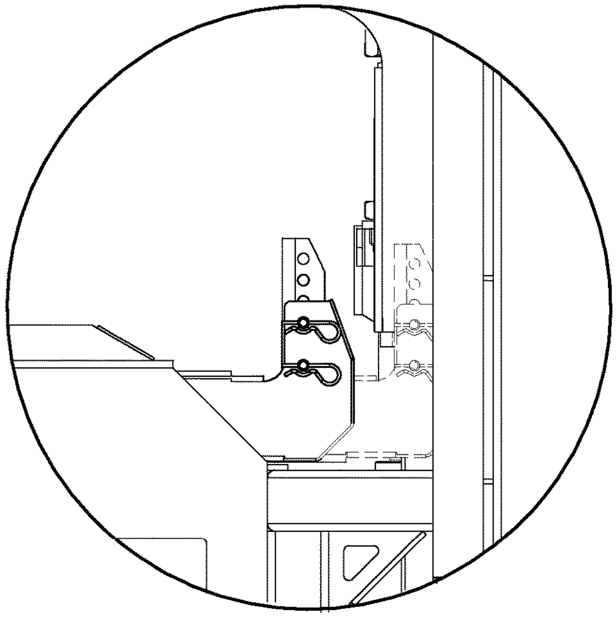
FIG. 5A is an enlarged view of encircled structure 5A of FIG. 5.
Figure 6:
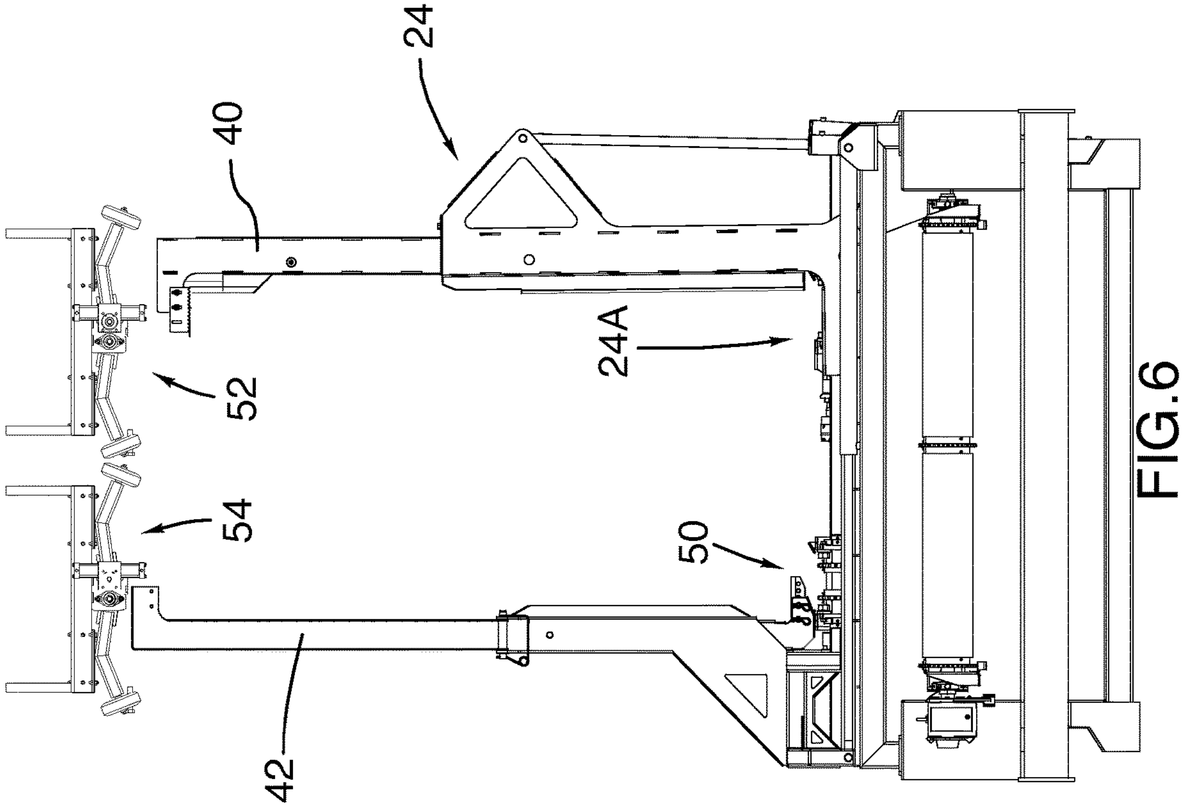
FIG. 6 is a view similar to FIG. 5, with the shuttle at the retracted, raised position.
Figure 8:
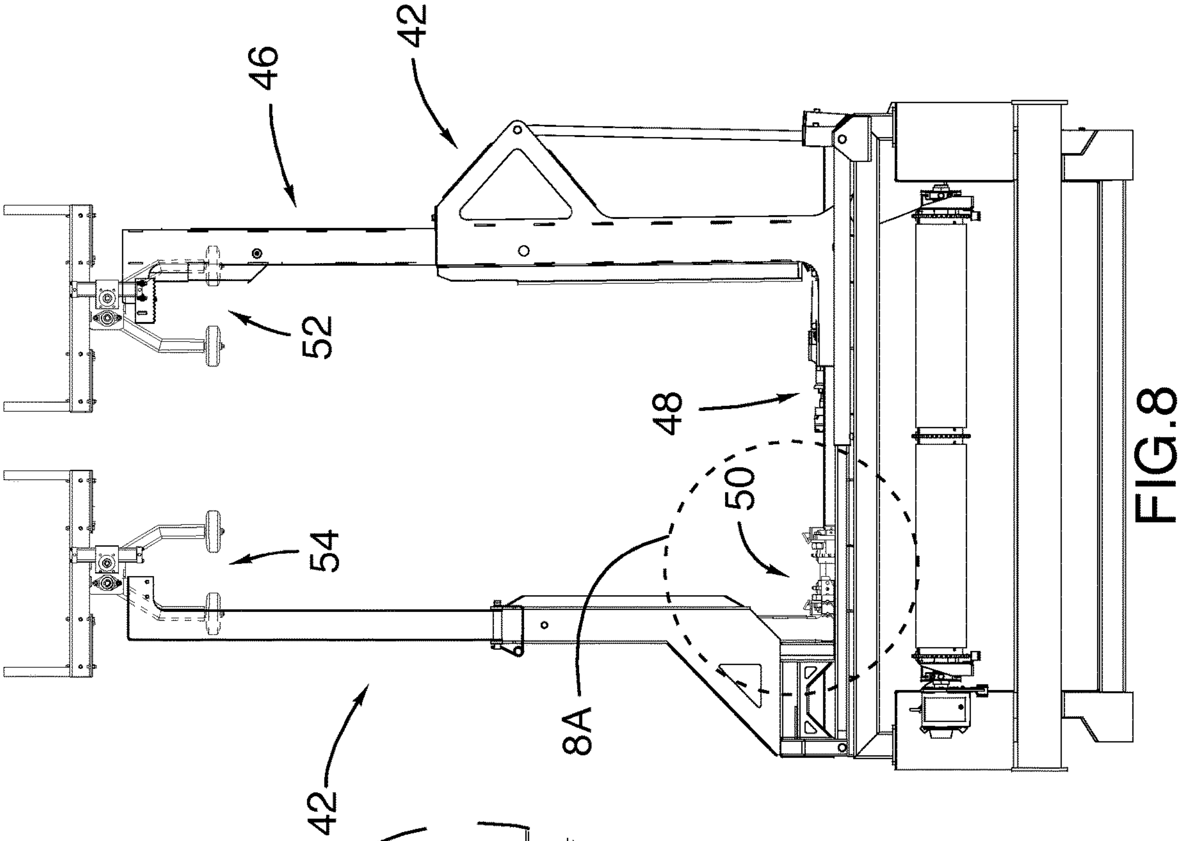
FIG. 8 is a view similar to FIG. 7, with the shuttle at the retracted, lowered position.
Figure 8A:
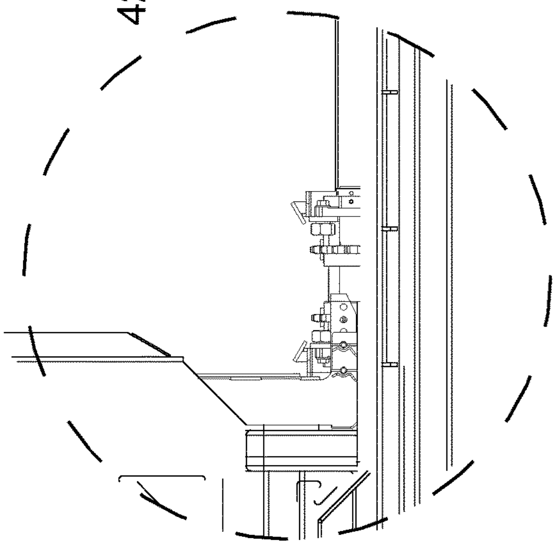
FIG. 8A is an enlarged view of the encircled structure of FIG. 8.

The shuttle 42 is movable between an extended, lowered position shown in FIG. 4, an elevated extended position shown in FIG. 5, an elevated, retracted position shown in FIG. 6 and a lowered, retracted position as shown in FIG. 8.

The uniter 30 similarly comprises a clamp 44 and a shuttle 46.

Figure 16:
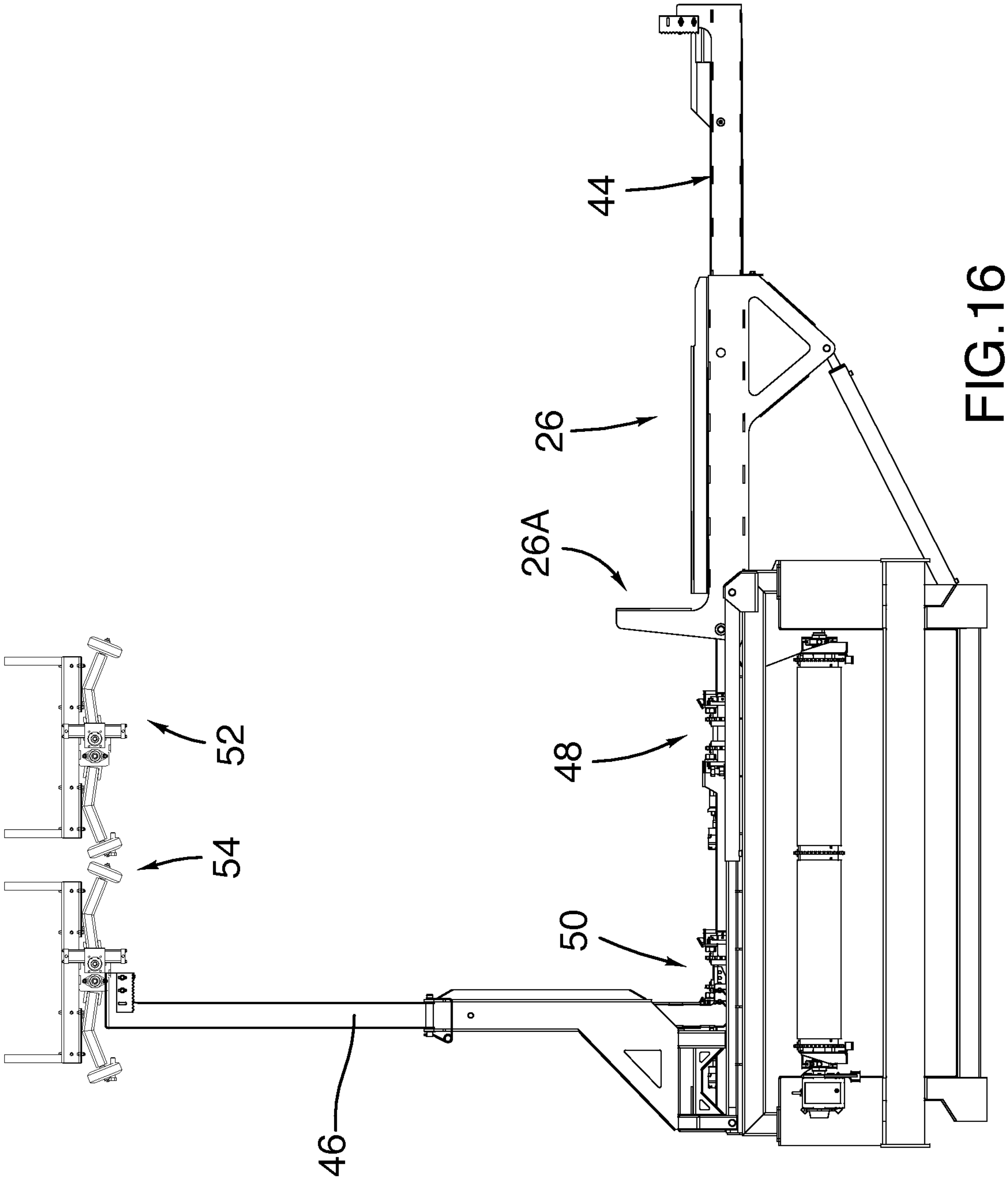
FIG. 16 is a view of the structure of FIG. 15, with the clamp at the release position.

The clamp 44 is associated with the unloading platform 26, again, mounted for telescopic relative movement thereto, between a release configuration shown in FIG. 16 and a gripping configuration shown in FIG. 15.

Figure 11:
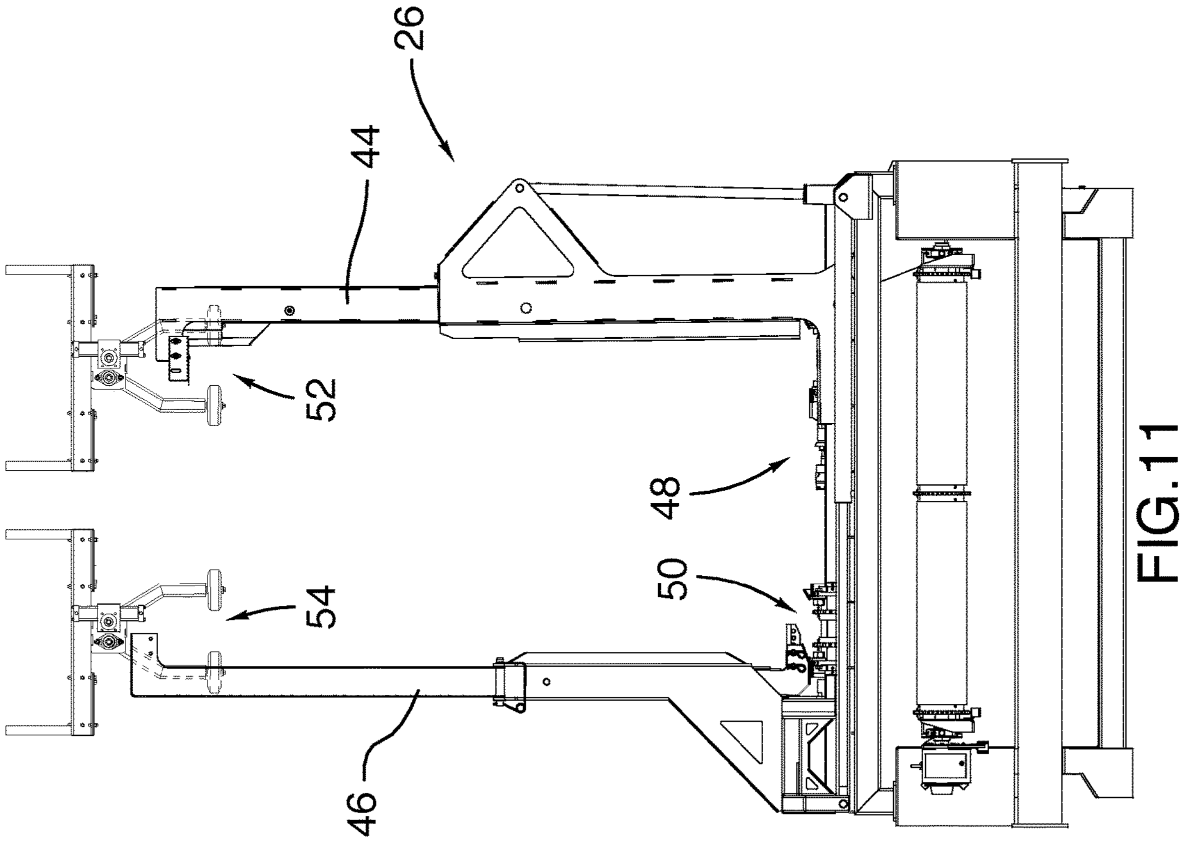
FIG. 11 is a view of the structure of FIG. 10, with the clamp at the gripping position and the shuttle at the retracted, raised position.
Figure 13:
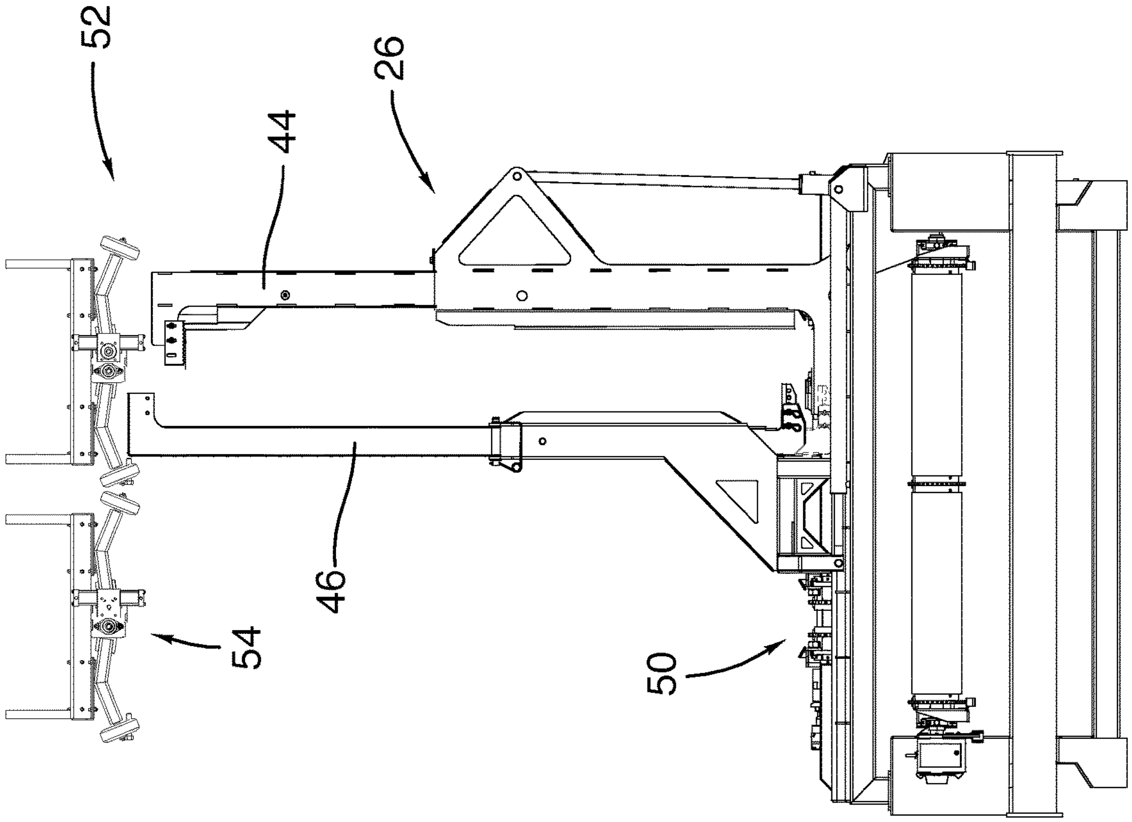
FIG. 13 is a view of the structure of FIG. 13, with the shuttle at the extended, raised position.

The shuttle 46 is movable between a lowered retracted position shown in FIG. 10, a raised retraction position shown in FIG. 11, an extended, raised position shown in FIG. 13 and an extended, lowered position shown in FIG. 14.

The transporter 32 comprises a pair of mat conveyors 48, 50 and a pair of roller arrangements 52, 54.

One 48 of the mat conveyors is sized and positioned to extend from a position immediately below the loading platform 24 (more particularly, the below the shoulder portion thereof 24A, when disposed in the raised position) to a position immediately below the unloading platform 26 (again, below the shoulder portion thereof, 26A, when disposed in the raised position).

The other 50 of the mat conveyors is sized and position to extend from immediately below the shuttle of the sputter (when disposed in the retracted, lowered position) to immediately below the shuttle of the miter (when disposed in the retracted, lowered position).

Figure 7:
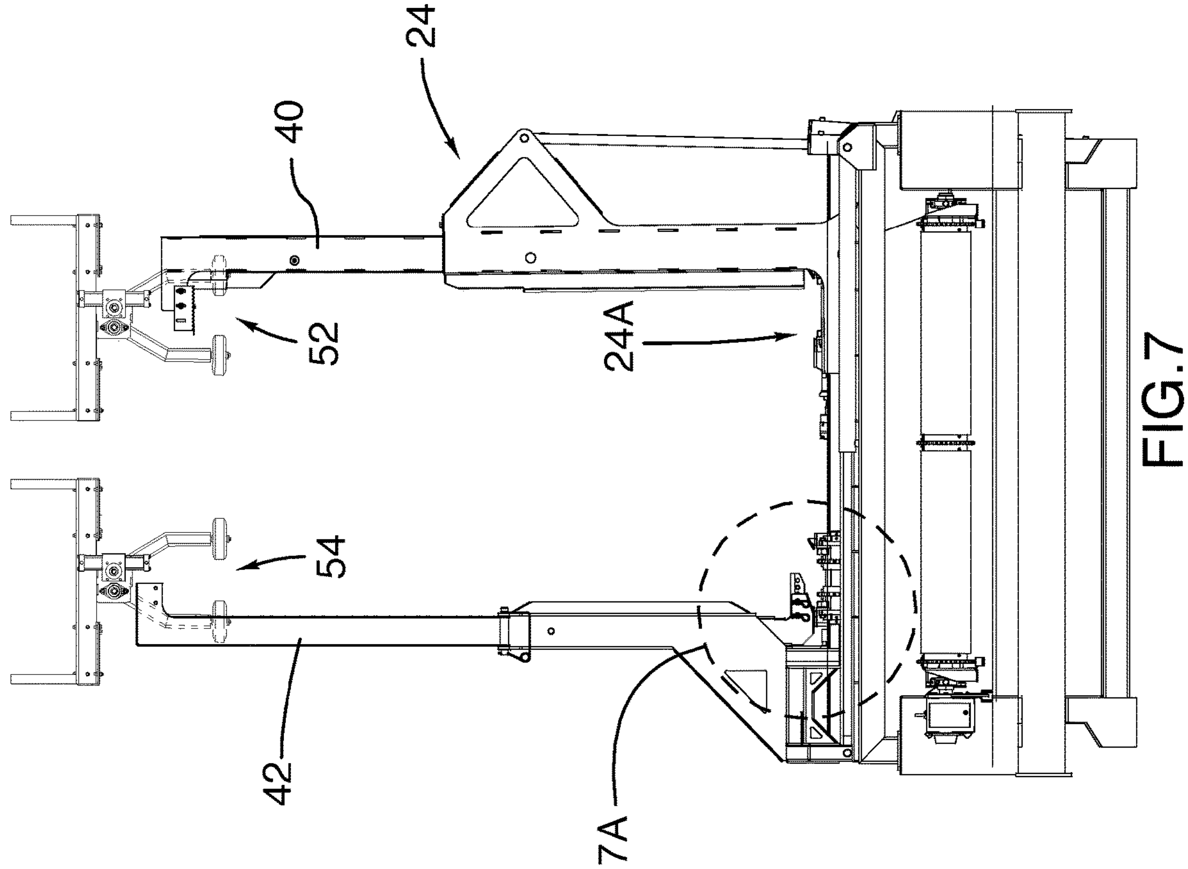
FIG. 7 is a view similar to FIG. 6, with the rollers at the extended position.
Figure 7A:
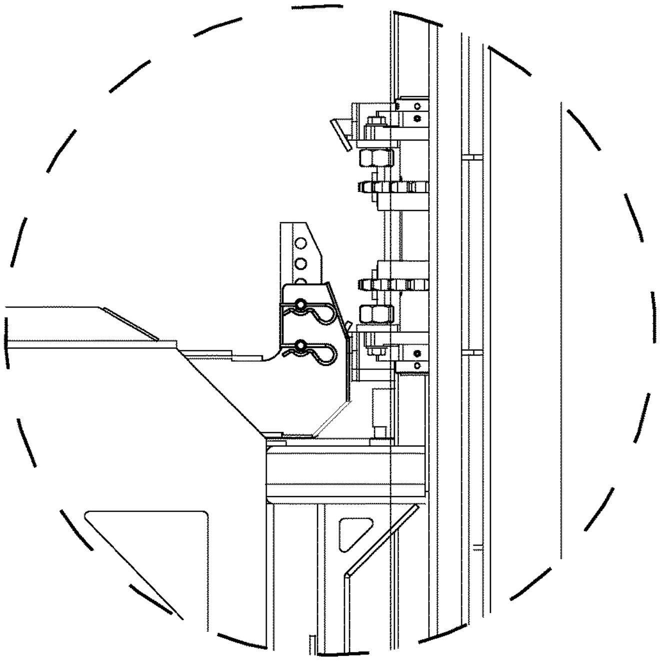
FIG. 7A is an enlarged view of the encircled structure of FIG. 7.
Figure 12:
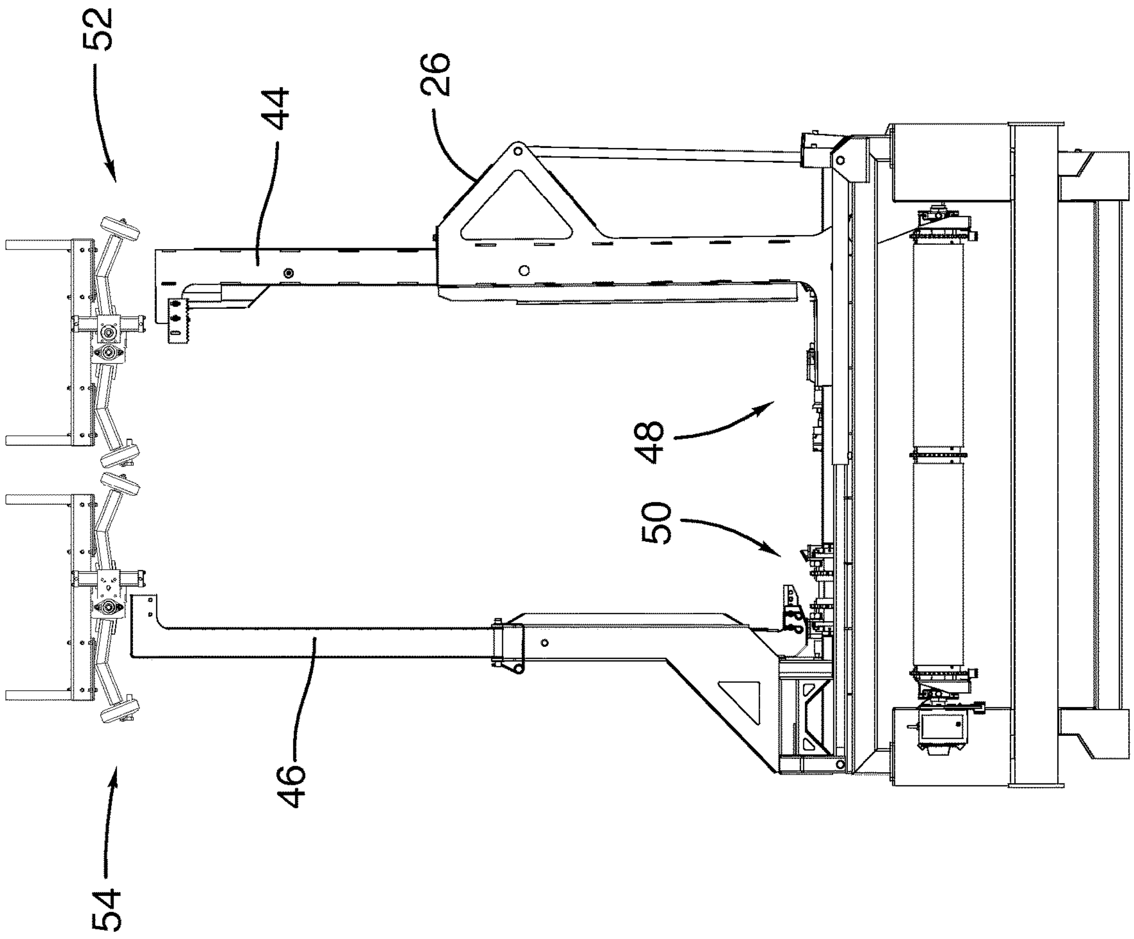
FIG. 12 is a view of the structure of FIG. 11, with the roller arrangements in the retracted position.

One 52 of the roller arrangements is positioned above the one 48 of the mat conveyors and is movable between an extended position shown in FIG. 7 and FIG. 11 and a retracted position shown in FIG. 6 and FIG. 12. The other 54 of the roller arrangement is positioned above the other 50 of the matt mat conveyors and is movable between an extended position shown in FIG. 7 and FIG. 11 and a retracted position shown in FIG. 6 and FIG. 12.

The washing facility 34 is disposed between the loading and the unloading platform and comprises an array of high pressure nozzles 56.

Figure 34:
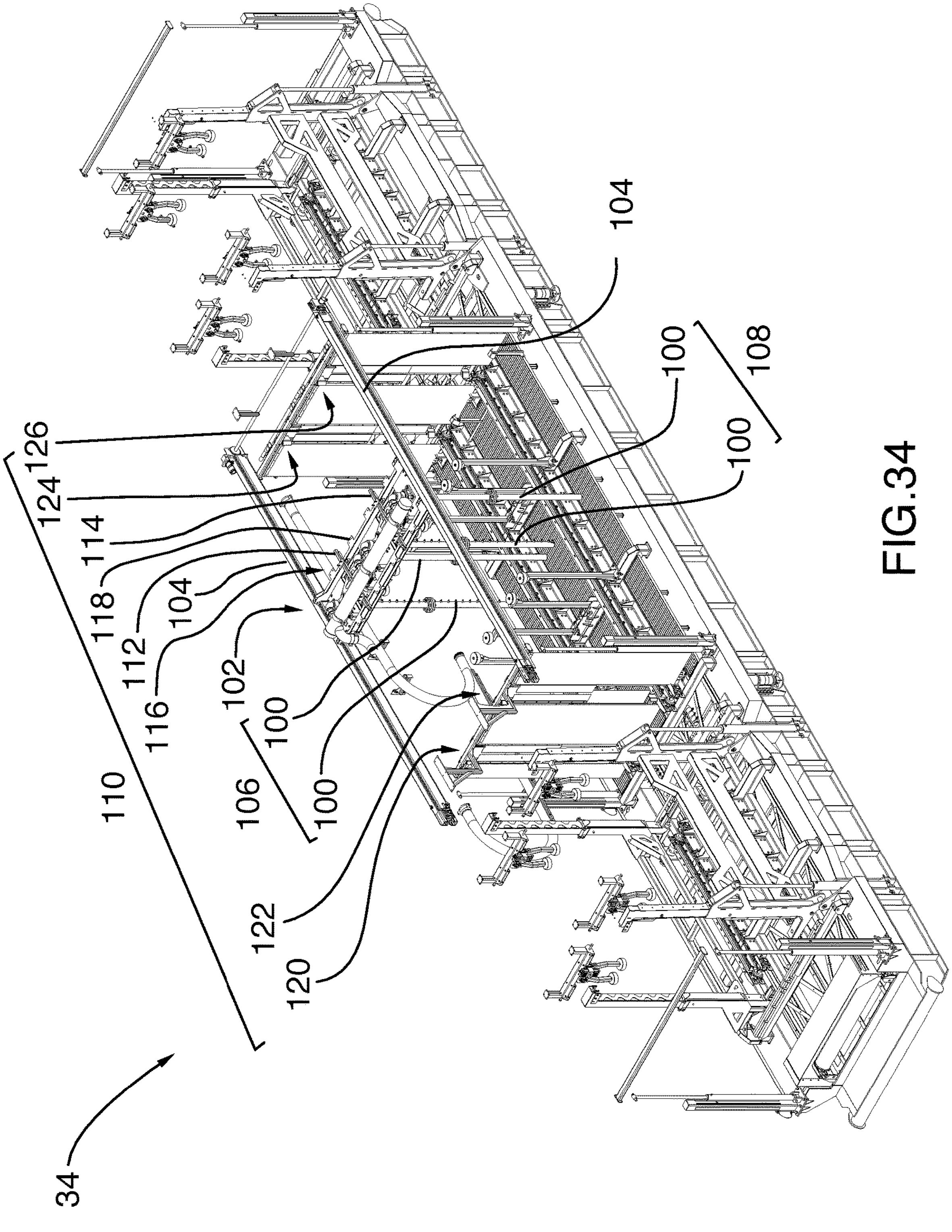
FIG. 34 is a view similar to FIG. 1, with portions removed for clarity.

The nozzles 56 are disposed on tubes 100 that extend from a carriage 102, the carriage being mounted upon rails 104 for reciprocating movement parallel to the conveyors and the tubes extending downwardly from the carriage in pairs 106, 108, each pair being disposed above and in flanking relation to one of the mat conveyors, each tube being mounted to its carriage for rotation about the tube axis, all as shown in FIG. 34.

In each pair of tubes, the nozzles are directed generally inwardly, such that the nozzles of one of the pair are orientated towards the other of the pair, and the nozzles of the other of the pair are orientated towards the one of the pair, but an actuator arrangement 110 provides for pivotal movement of the tubes such that the nozzles are also directed generally in the direction of rotation of the carriage.

Figure 35F:
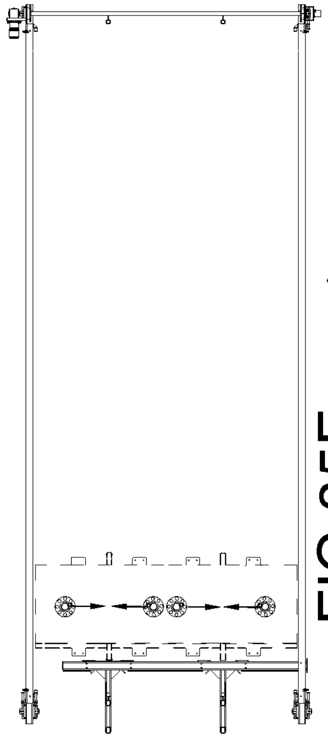
FIG. 35F is a view similar to FIG. 35A showing the position of the nozzles when the carriage is intermediate the position shown in FIG. 35E and the position shown in 35A.
Figure 35E:
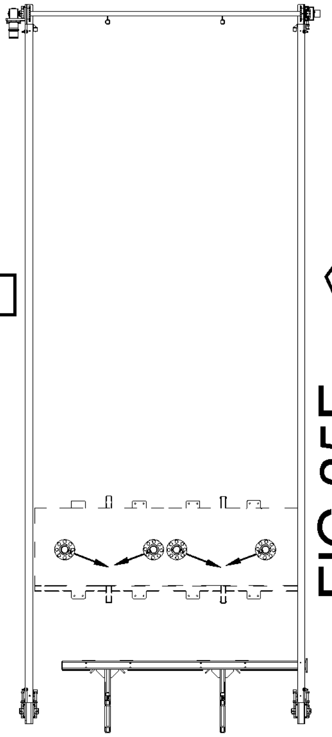
FIG. 35E is a view similar to FIG. 35A showing the position of the nozzles as the carriage first contacts the abutment structure adjacent the loading platform.
Figure 35D:
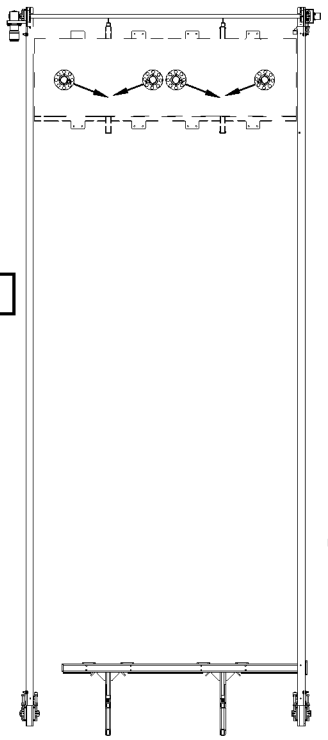
FIG. 35D is a view showing the position of the nozzles when the carriage is the end of its travel nearest the unloading platform.
Figure 35A:
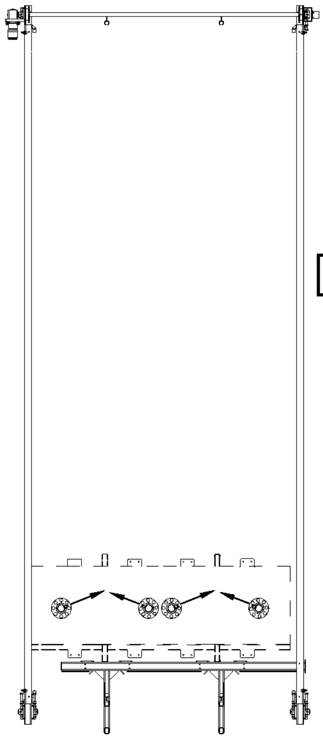
FIG. 35A is a plan view of the washing facility, with portions removed for clarity, showing the position of the nozzles when the carriage is the end of its travel nearest the loading platform.
Figure 35B:
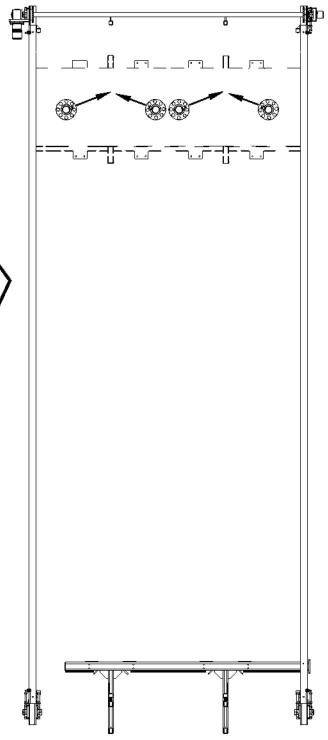
FIG. 35B is a view similar to FIG. 35A showing the position of the nozzles as the carriage first contacts the abutment structure adjacent the unloading platform.
Figure 35C:
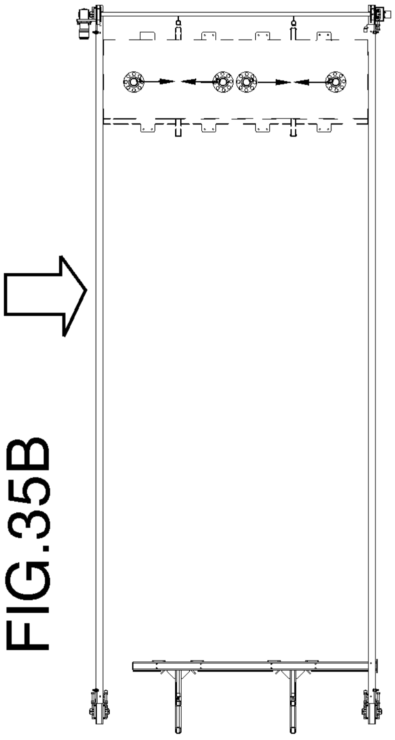
FIG. 35C is a view similar to FIG. 35A showing the position of the nozzles when the carriage is intermediate the position shown in FIG. 35C and the position shown in 35D.
Figures 36A, 36B, 36C, 36D, 36E, 36F:
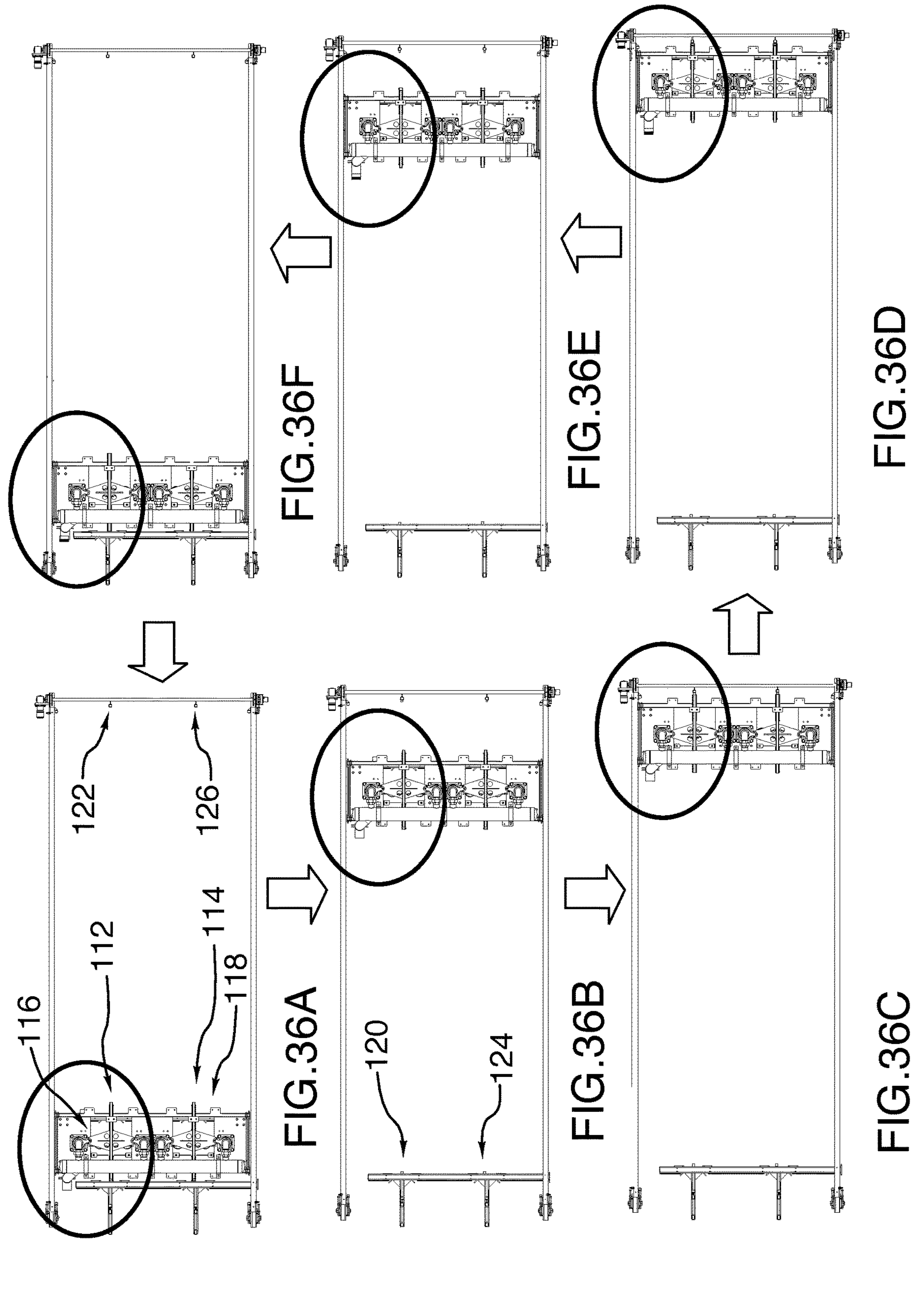
FIG. 36A is a view similar to FIG. 35A showing more detail.
FIG. 36B is a view similar to FIG. 35B showing more detail.
FIG. 36C is a view similar to FIG. 35C showing more detail.
FIG. 36D is a view similar to FIG. 35D showing more detail.
FIG. 36E is a view similar to FIG. 35E showing more detail.
FIG. 36F is a view similar to FIG. 35F showing more detail.
Figure 37A:
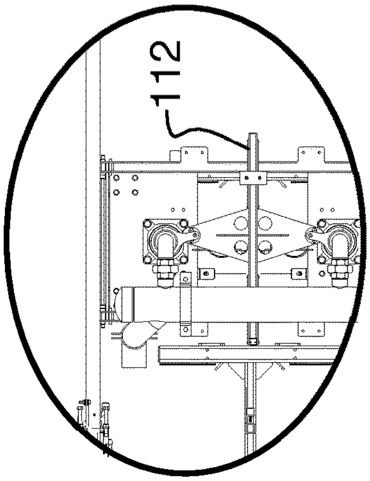
FIG. 37A is a detail view of encircled area 37A of FIG. 36A.
Figure 37B:
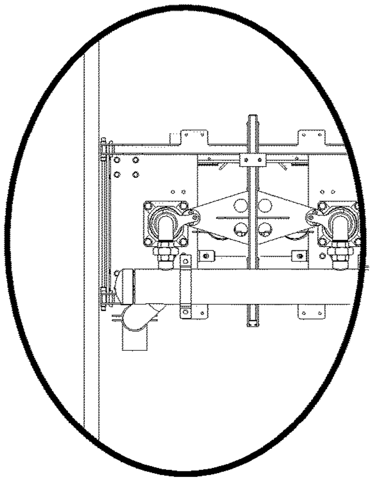
FIG. 37B is a detail view of encircled area 37B of FIG. 36B.
Figure 37C:
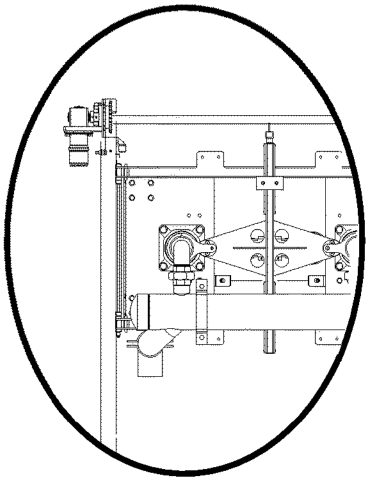
FIG. 37C is a detail view of encircled area 37C of FIG. 36C.
Figure 37D:
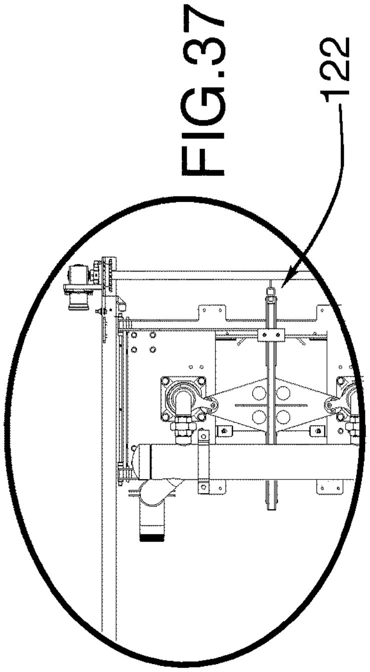
FIG. 37D is a detail view of encircled area 37D of FIG. 36D.
Figure 37E:
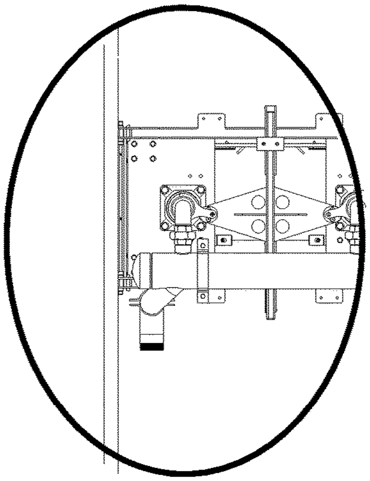
FIG. 37E is a detail view of encircled area 37E of FIG. 36E.
Figure 37F:
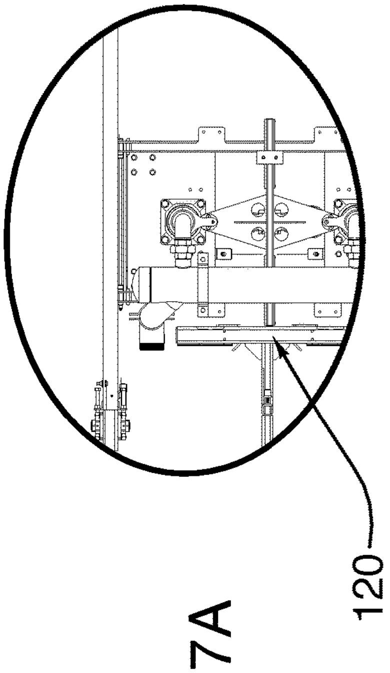
FIG. 37F is a detail view of encircled area 37F of FIG. 36F.

The motion of the nozzles is shown in FIGS. 35A-35; the nozzles are generally orientated parallel to the plane upon which the apparatus sits, i.e nominally horizontal and, but for the vicinity immediately adjacent the ends of the rails, are directed at an angle of 45 degrees to the direction of movement of the carriage. The actuator is shown in FIGS. 36 and 37 and will be seen to be defined by a bar 112, 114 provided for each pair of tubes, the bar being mounted to the tubes by a linkage 116, 118 that allows for reciprocating movement of the bar between a pair of positions and that provides for pivotal movement of the tubes associated with such reciprocating movement. Reciprocating movement of the bar 112, 114 is achieved by appropriate abutment structures 120, 124, 122, 126 positioned at the ends of the rails 104; as the carriage 102 nears the end of its movement, each bar 112, 114 contacts the adjacent abutment member and is urged, upon movement of the carriage 102 to the end of its movement, to the position opposite to that which it was immediately preceding the commencement of the abutment.

The soil handling arrangement 35 will be seen in FIGS. 38-40 to include a trough 200 and a debris conveyor 202.

The trough 200 defines the bottom of the body and has a surface 204 that is disposed at an angle to the mat conveyors, i.e. when the body is disposed horizontally, the surface slopes downwardly towards one end of the body. It will be appreciated that the sloping surface allows for any water and suspended fines therein that the trough may receive will travel to the end of the body and be collected, for example, by a filter, to remove the fines, for reuse or sewerage of the water.

The debris conveyor is slidably mounted to the body between the trough and the mat conveyors for movement between a retracted position, shown in FIG. 1, wherein the conveyor lies fully within the body and an extended position, shown in FIG. 38 wherein an end of the conveyor protrudes beyond the end of the body opposition to that which the surface slopes, and is adapted such that any solids that the conveyor may receive will be ejected off the protruding end. If the body is at a suitable elevation, such as would be the case if supported on a container trailer, a bin could be deposited beneath the protruding end to collect the solids for disposal.

The apparatus 20 is shown in use in FIGS. 17-32.

Figure 17:
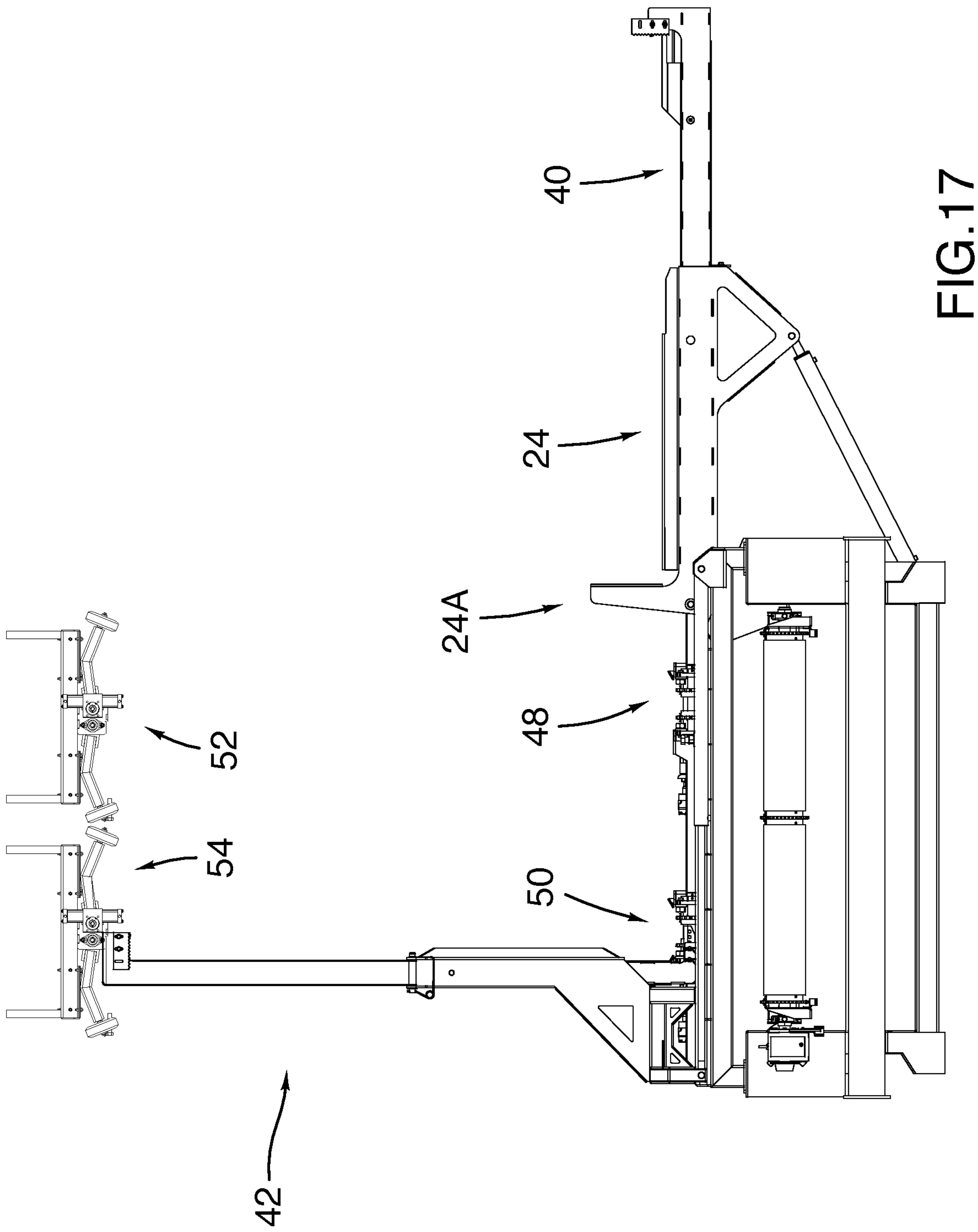
FIG. 17 is a view similar to FIG. 2.

Operation commences with the loading platform in the lowered position and the clamp 40 in the extended position, as shown in FIG. 17.

Figure 18:
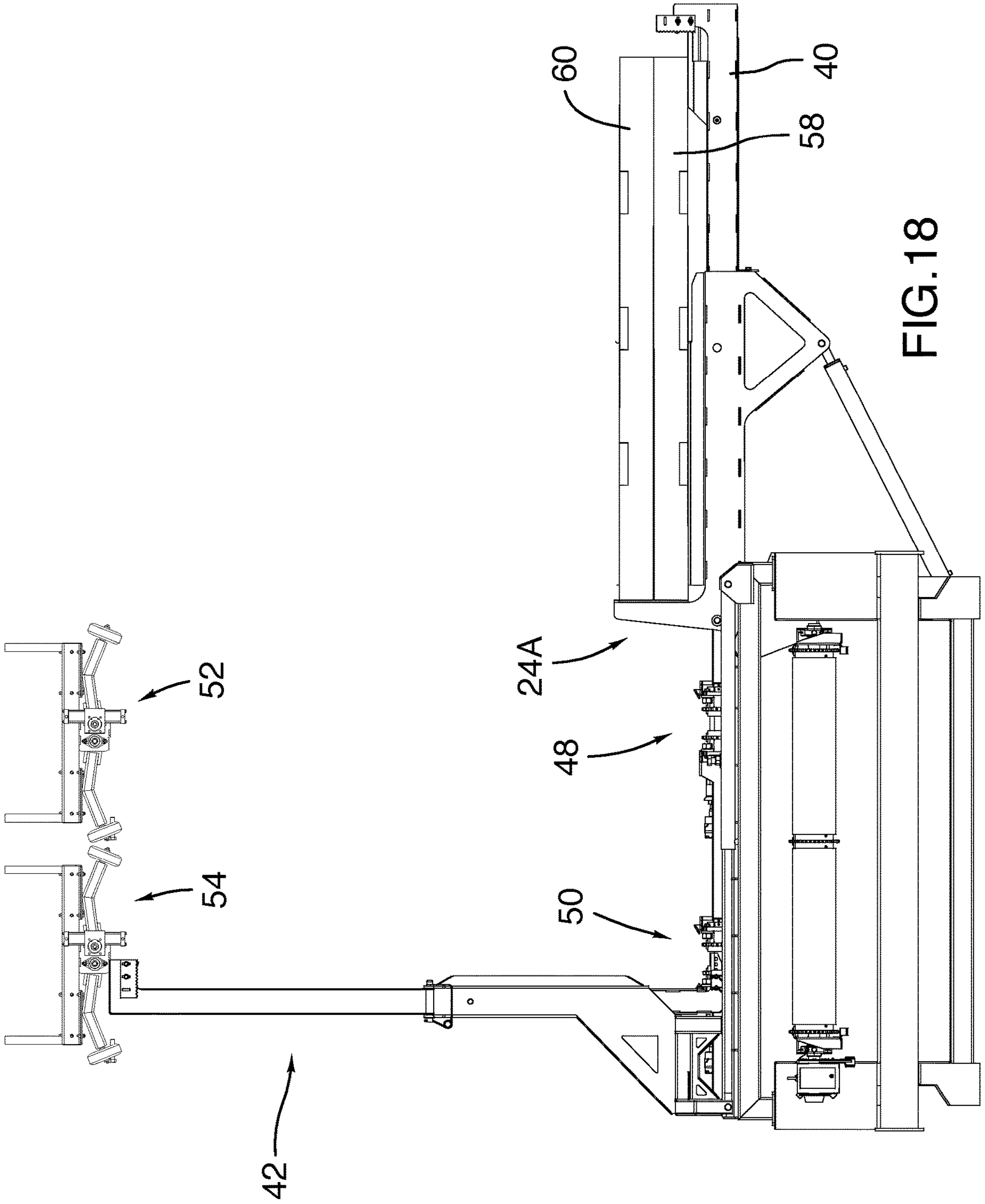
FIG. 18 is a view similar to FIG. 17, with the loading platform in receipt of a pair of mats.
Figure 19:
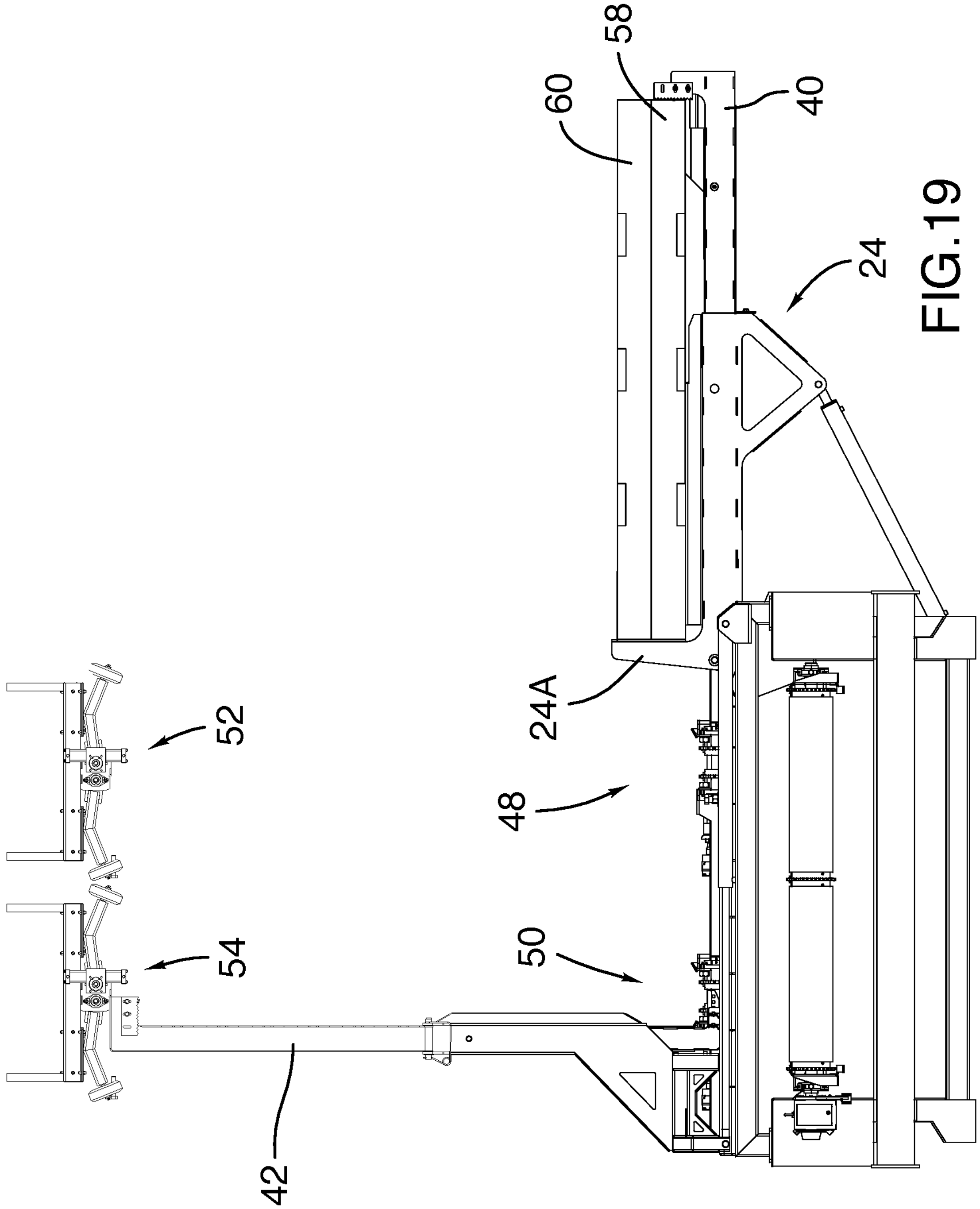
FIG. 19 is a view similar to FIG. 18 with the clamp of the loading platform at the gripping position.
Figure 20:
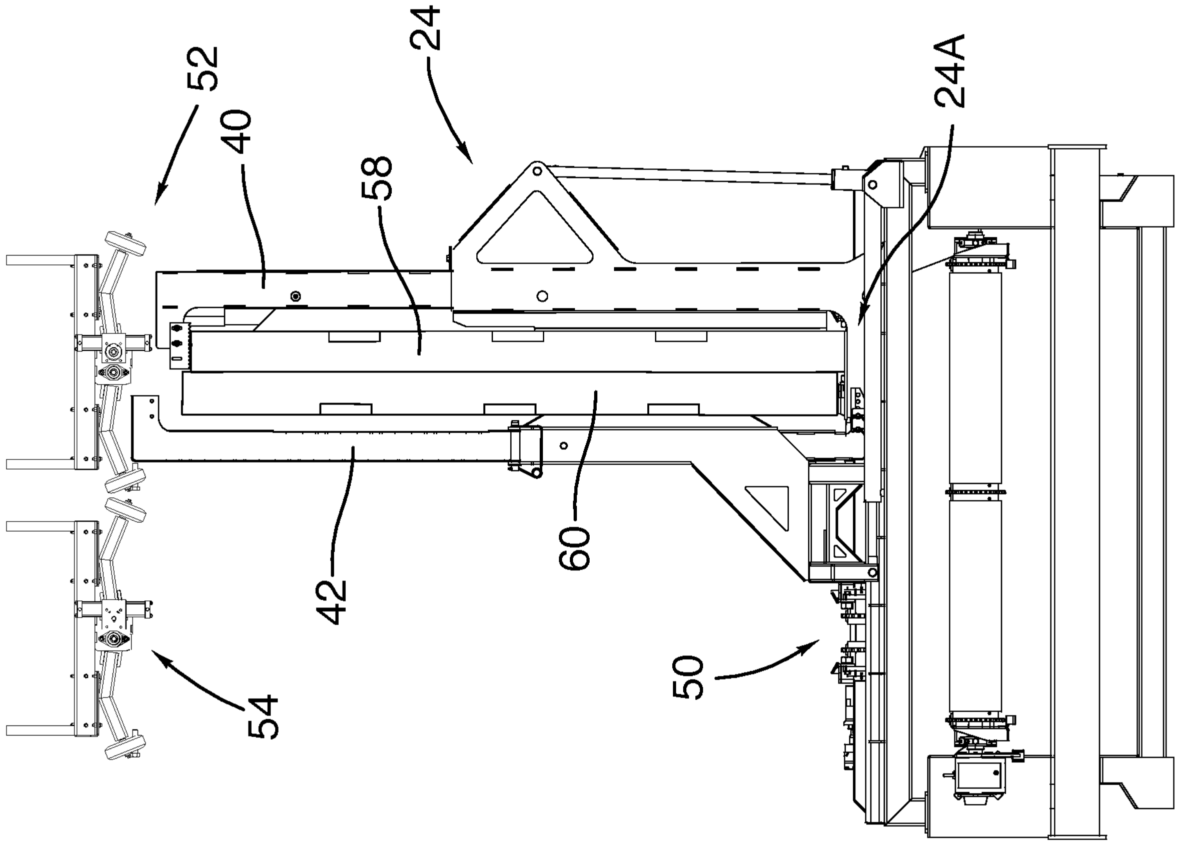
FIG. 20 is a view similar to FIG. 19 with the loading platform at the raised position and the shuttle at the extended, lowered position.

Thereafter: a pair of mats 58, 60 are placed upon the platform, as shown in FIG. 18, with one 58 of the pair of mats being disposed upon the platform and the other 60 of the pair of mats being disposed upon the one of the mats; the gripper is moved to the gripping position, as shown in FIG. 19; and the loading platform is moved to the raised position, as shown in FIG. 20, thereby to deposit the one of the mats on the one of the conveyors.

Figure 21:
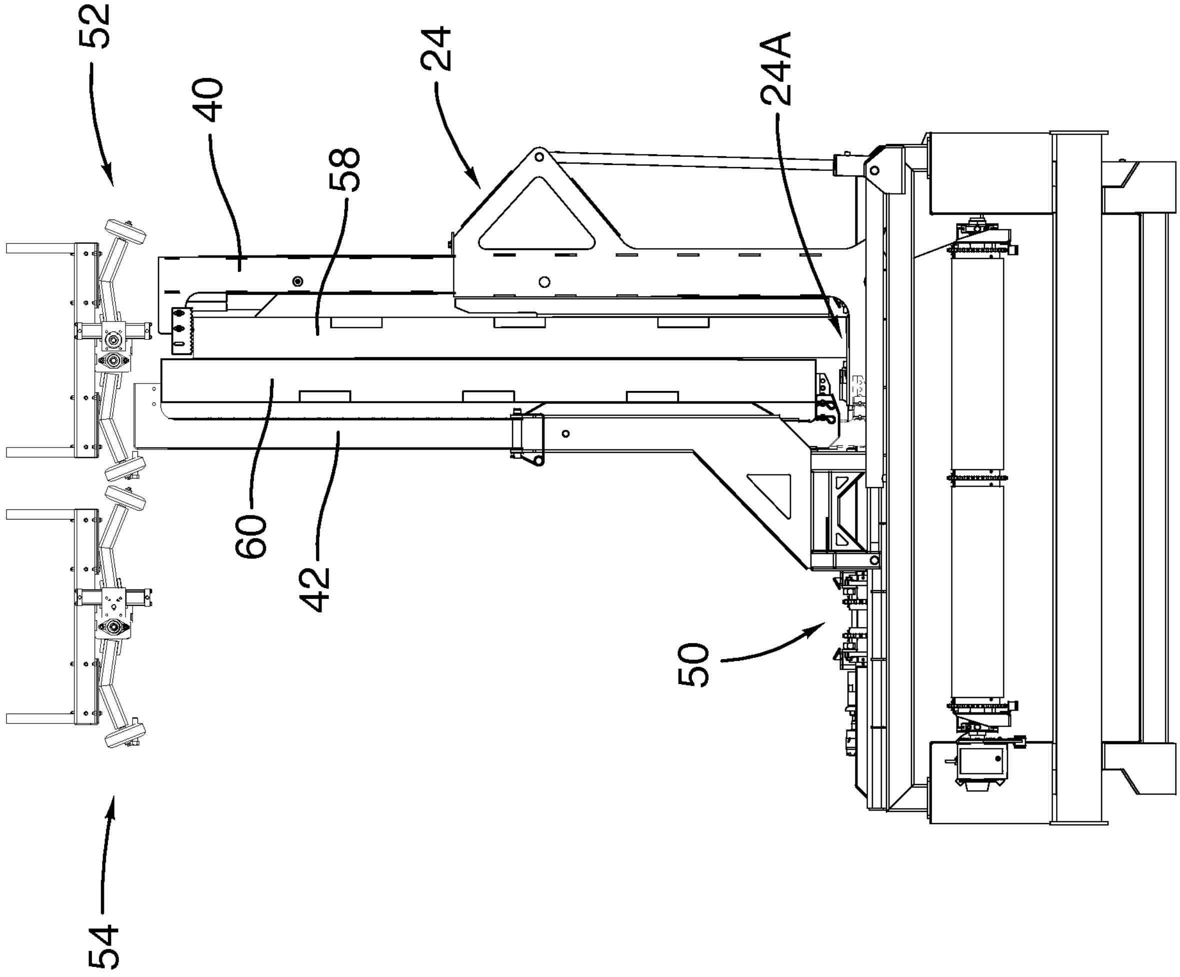
FIG. 21 is a view similar to FIG. 20, with the shuttle at the extended, raised position.

The shuttle of the splitter is shown in FIG. 20 to be at the extended, lowered position, and will be understood to have been moved to this position prior to completion of the movement of loading platform to the raised position, thereby to ensure that the mat is supported. The shuttle is thereafter moved to the raised, extended position to lift the other of the mats off the loading platform and into gripping engagement with the overhanging lip of the shuttle, as shown in FIG. 21, and thence to the retracted, raised position, as shown in FIG. 22, whereat the other of the mat will be disposed above the other of the conveyors.

Figure 22:
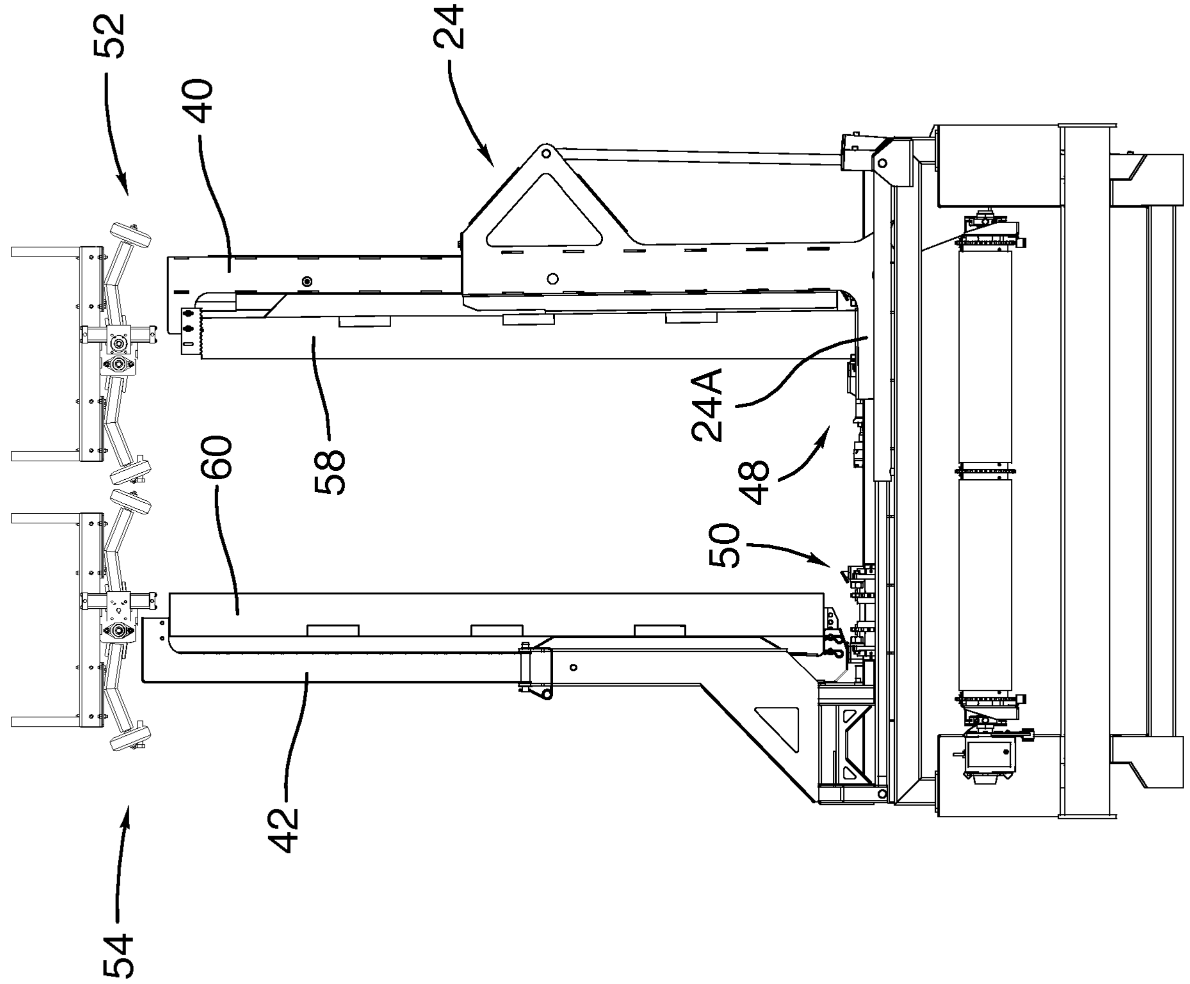
FIG. 22 is a view similar to FIG. 21, with the shuttle at the retracted, raised position.
Figure 23:
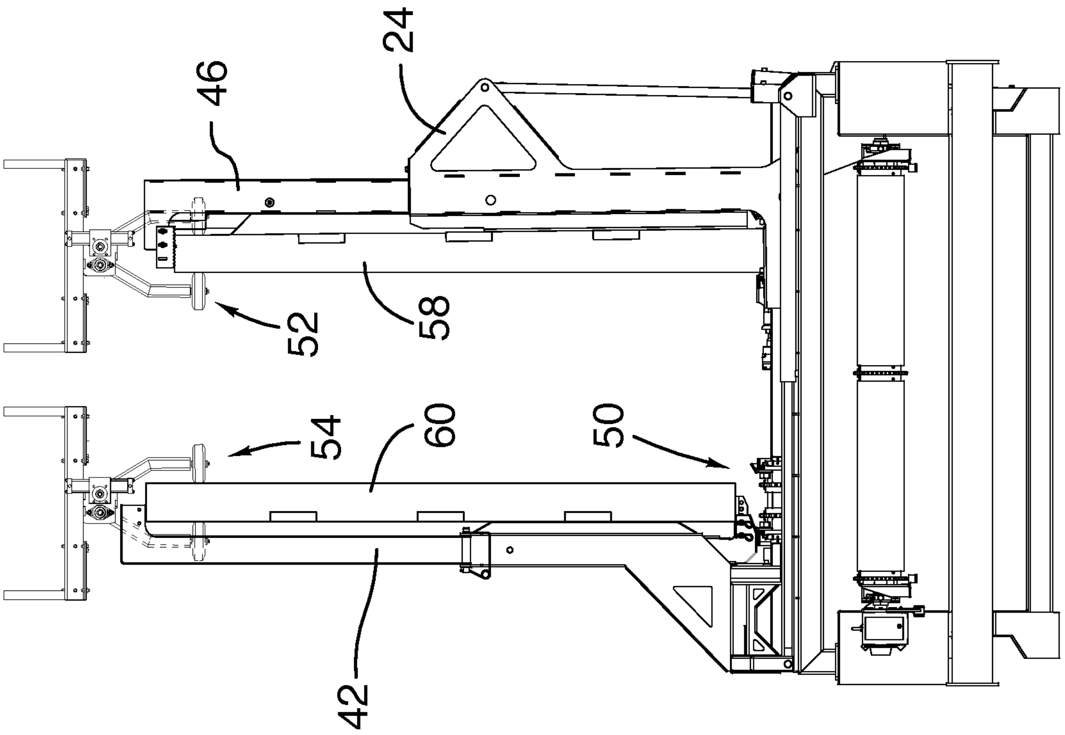
FIG. 23 is a view similar to FIG. 22, with the roller arrangement at the extended configurations.
Figure 24:
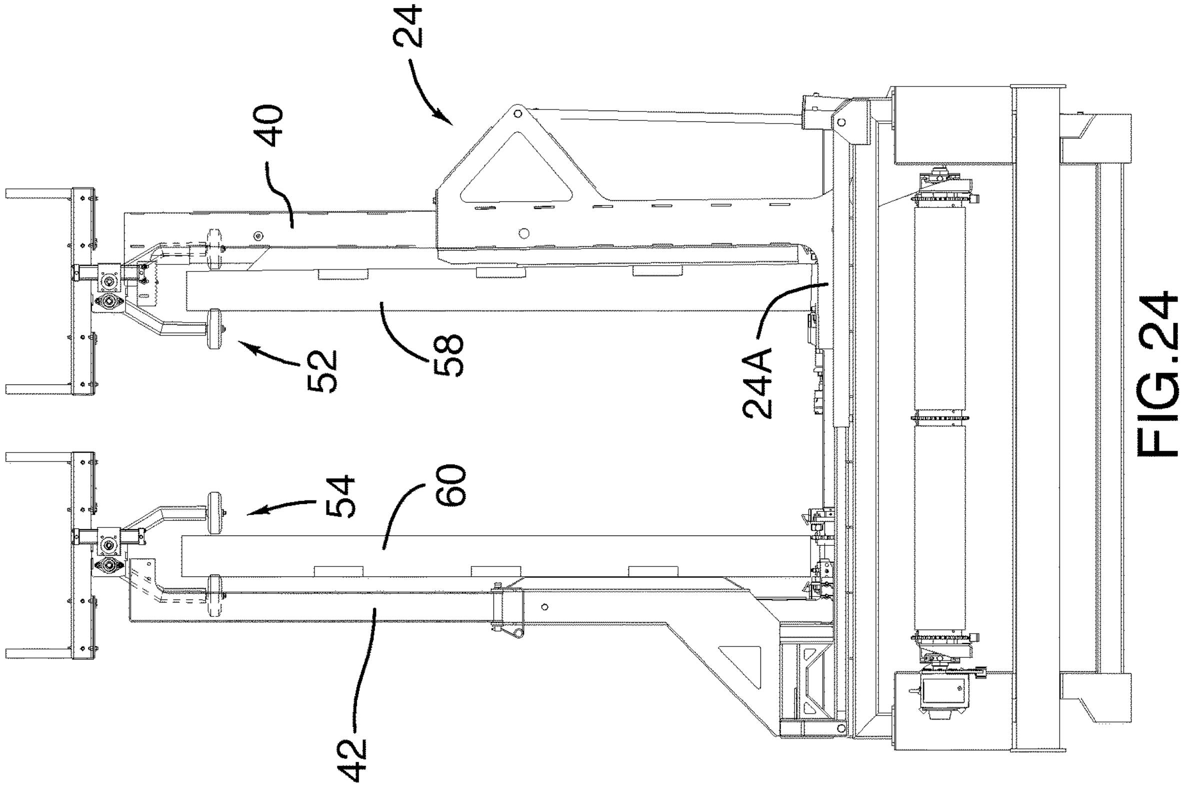
FIG. 24 is a view similar to FIG. 23, with the shuttle at the retracted, lowered position.

The roller arrangements, at this stage, move from the retracted positions shown in FIG. 22 [to which they had previously been moved to permit clearance for the aforementioned movement of the mats and shuttles, etc.] to the extended positions shown in FIG. 23, and which point they will be understood to hold the mats upright, whereupon the clamp of the loading platform can be moved to the release position and the shuttle can be moved to the retracted, lowered position, whereupon each mat will be disposed upon a respective conveyor and free to be moved thereby. This position of the mats will be understood to define an entry position thereof.

Figure 25:
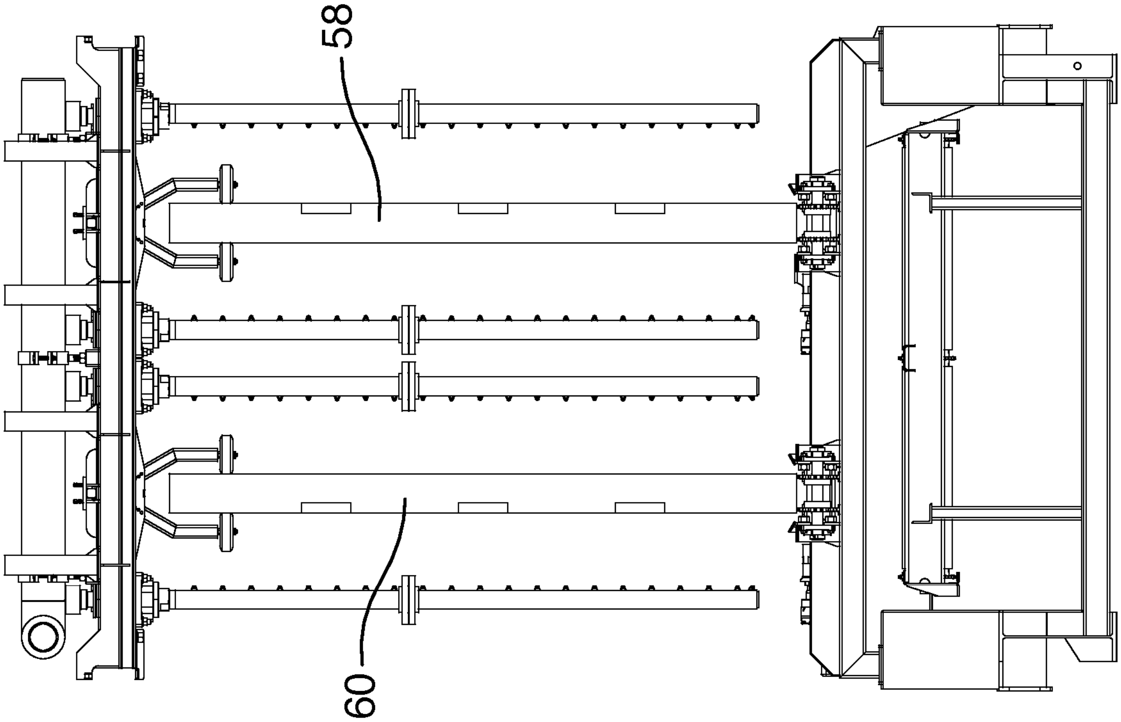
FIG. 25 is a view similar to FIG. 9, in use with the pair of mat.
Figure 26:
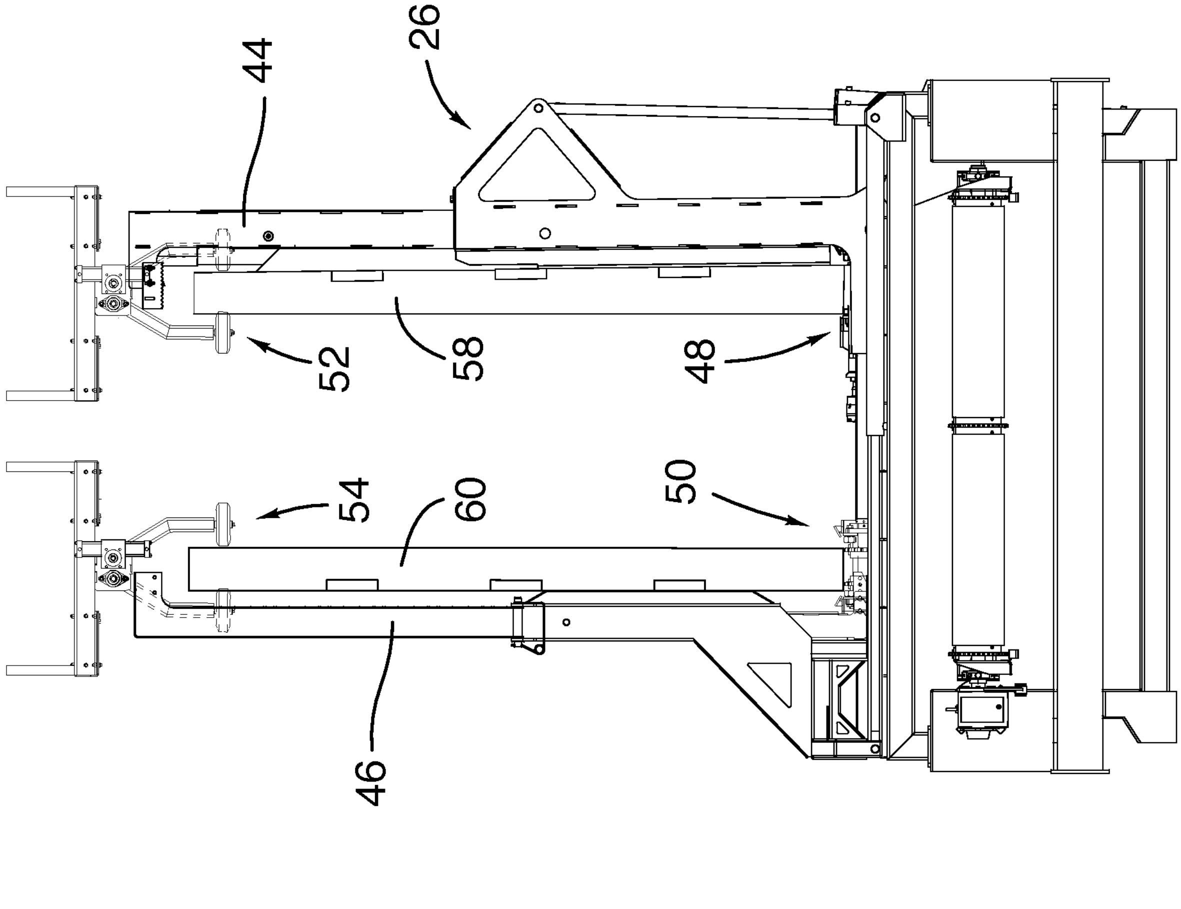
FIG. 26 is a view similar to FIG. 10, in use with the pair of mats.

Thereafter, the conveyors will be actuated, to cause the mats to travel lengthwise to the body to traverse the washing facility, wherein the mats will be understood to be cleaned via streams of high pressure water, as indicated in FIG. 25, until the mats reach the exit position shown in FIG. 25

At the exit position, it will be understood that the one of the mats is disposed immediately above the unloading platform and the other of mats is disposed immediately above the shuttle, both having been previously positioned in the raised and retracted, lowered positions, respectively.

Figure 27:
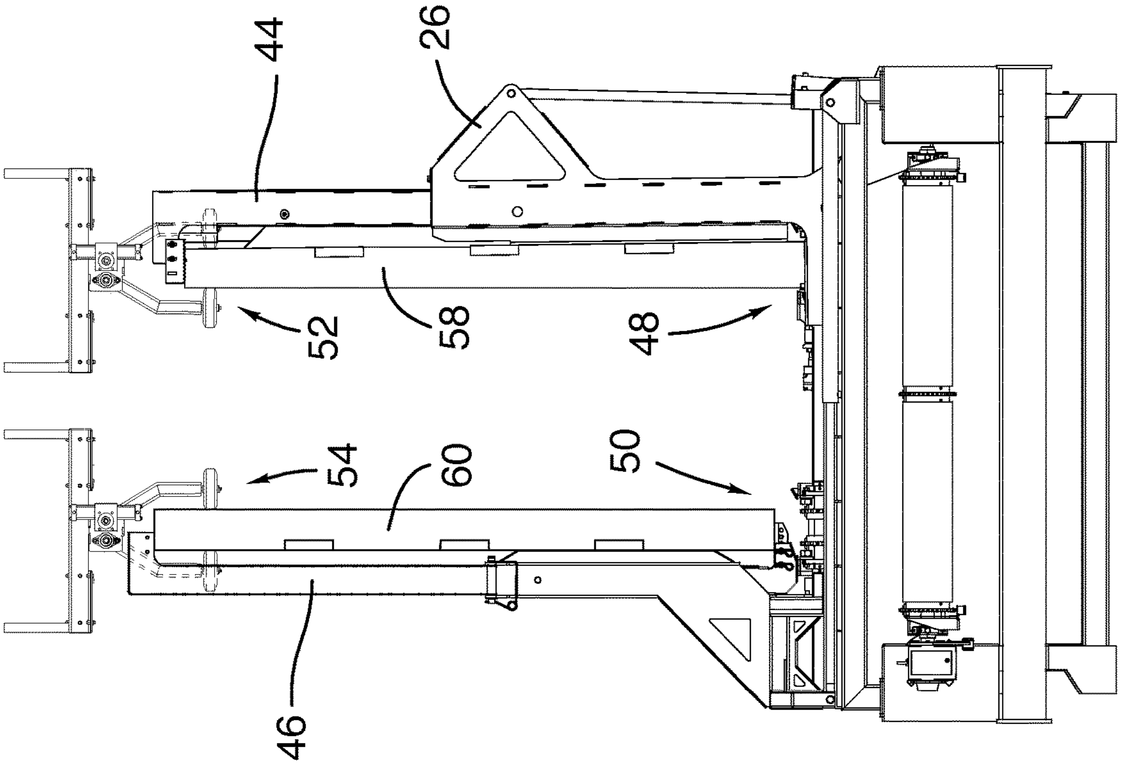
FIG. 27 is a view similar to FIG. 26, with the shuttle at the retracted, raised position.
Figure 28:
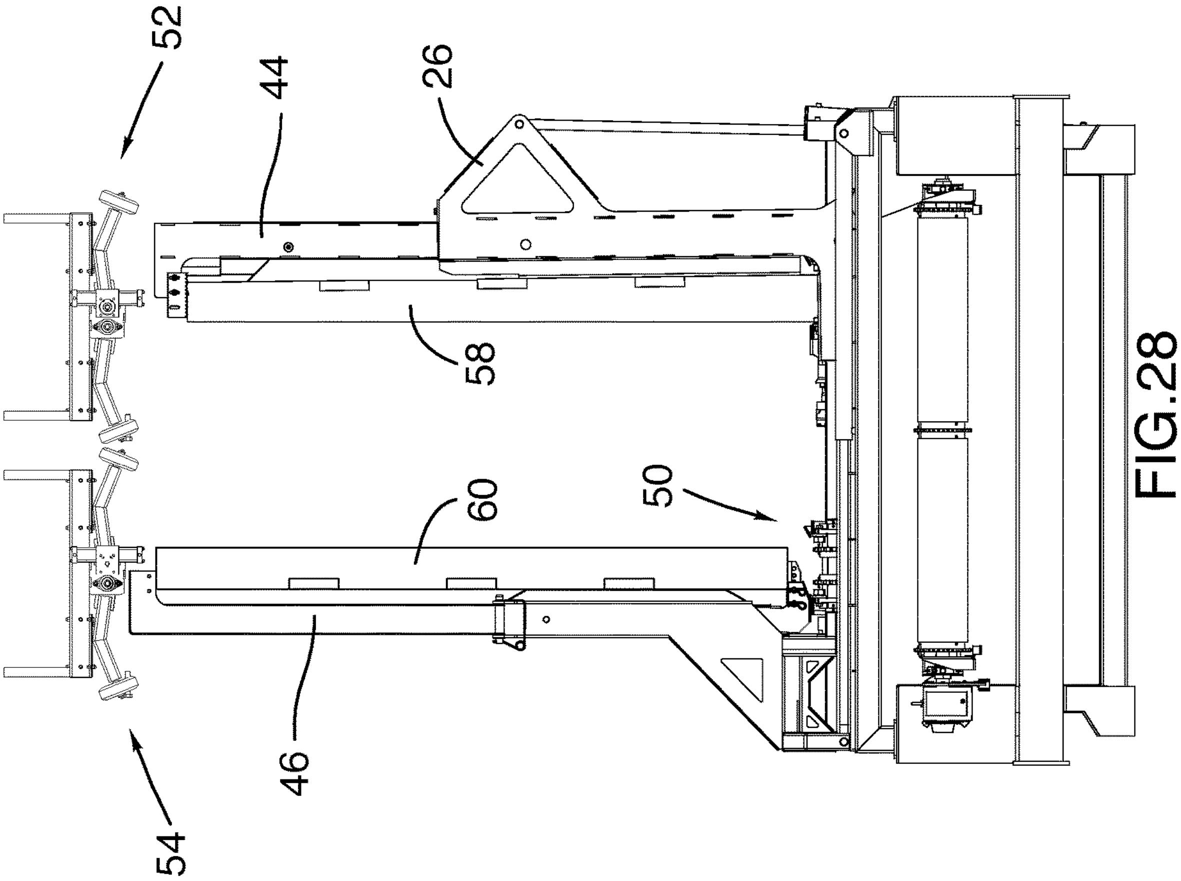
FIG. 28 is a view similar to FIG. 27, with the roller arrangements retracted.
Figure 29:
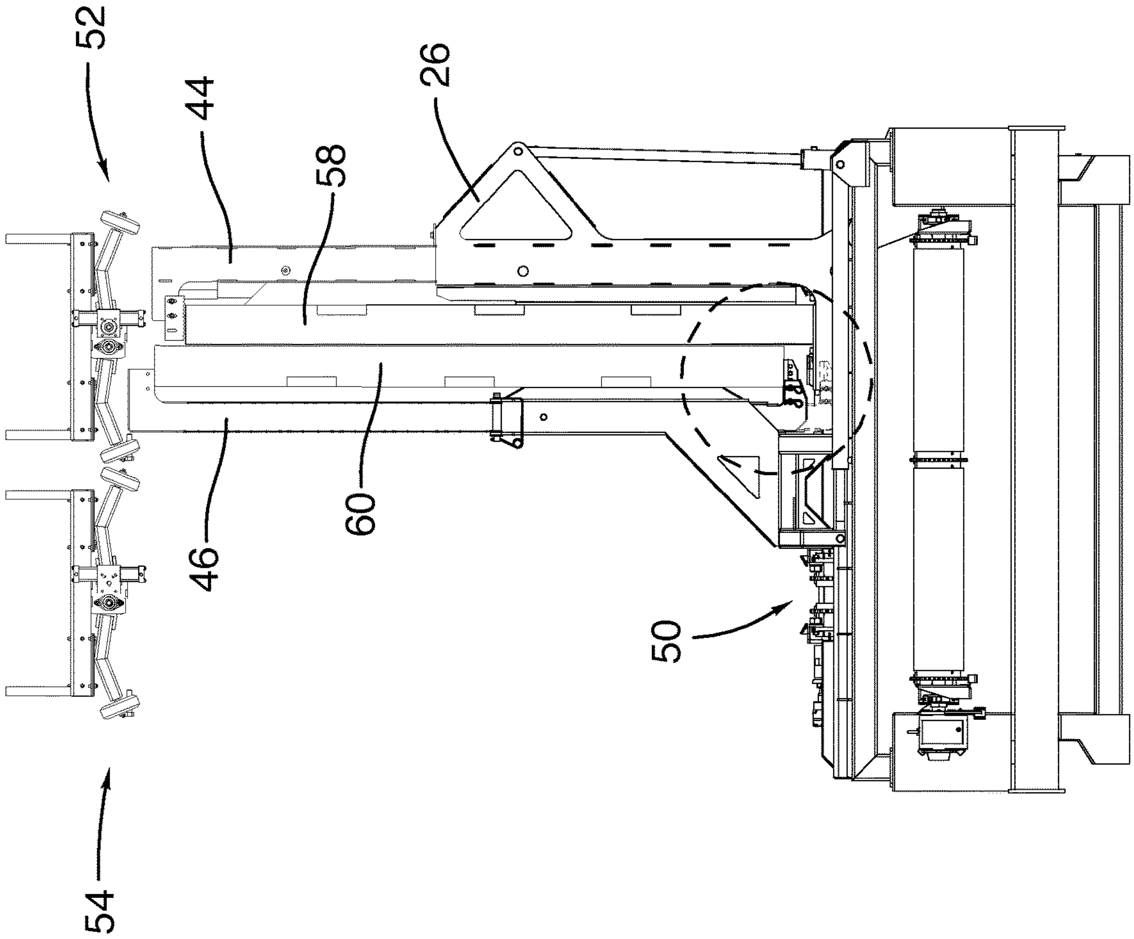
FIG. 29 is a view similar to FIG. 28, with the shuttle at the extended, raised position.
Figure 30:
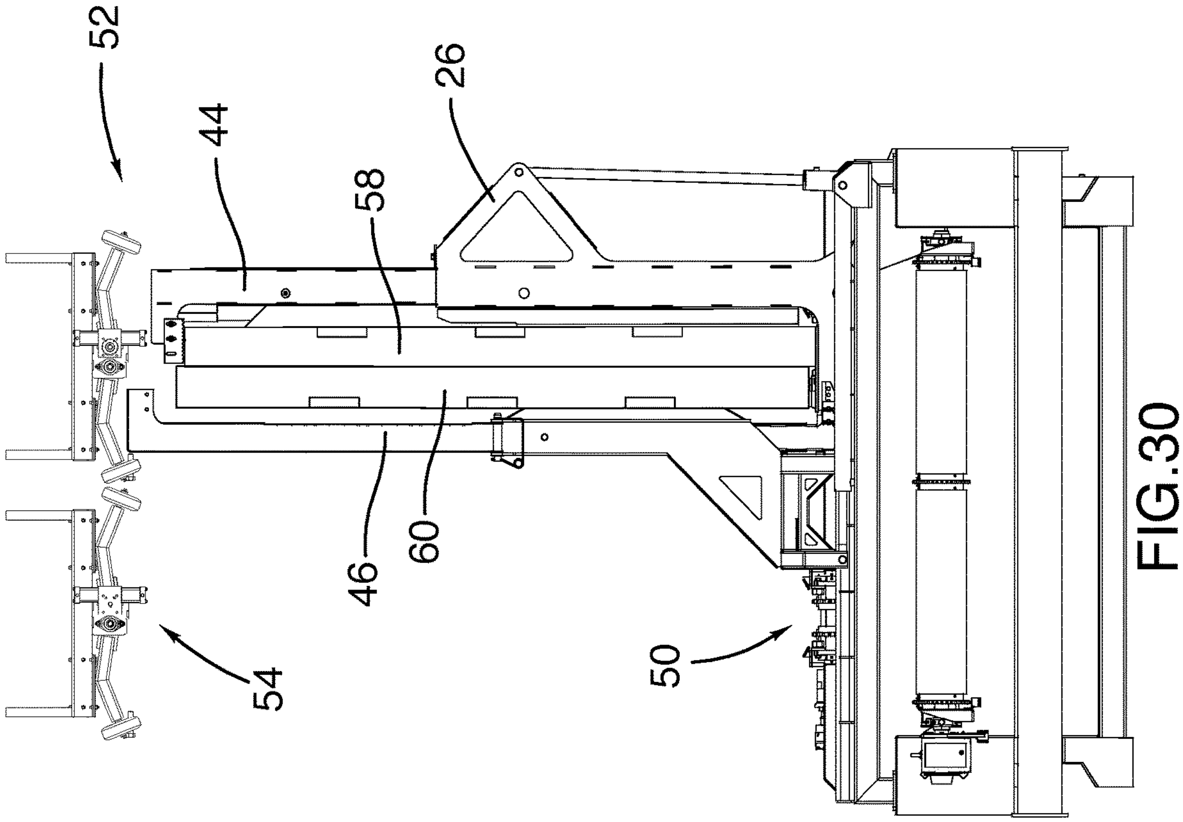
FIG. 30 is a view similar to FIG. 29, with the shuttle at the extended, lowered position.
Figure 31:
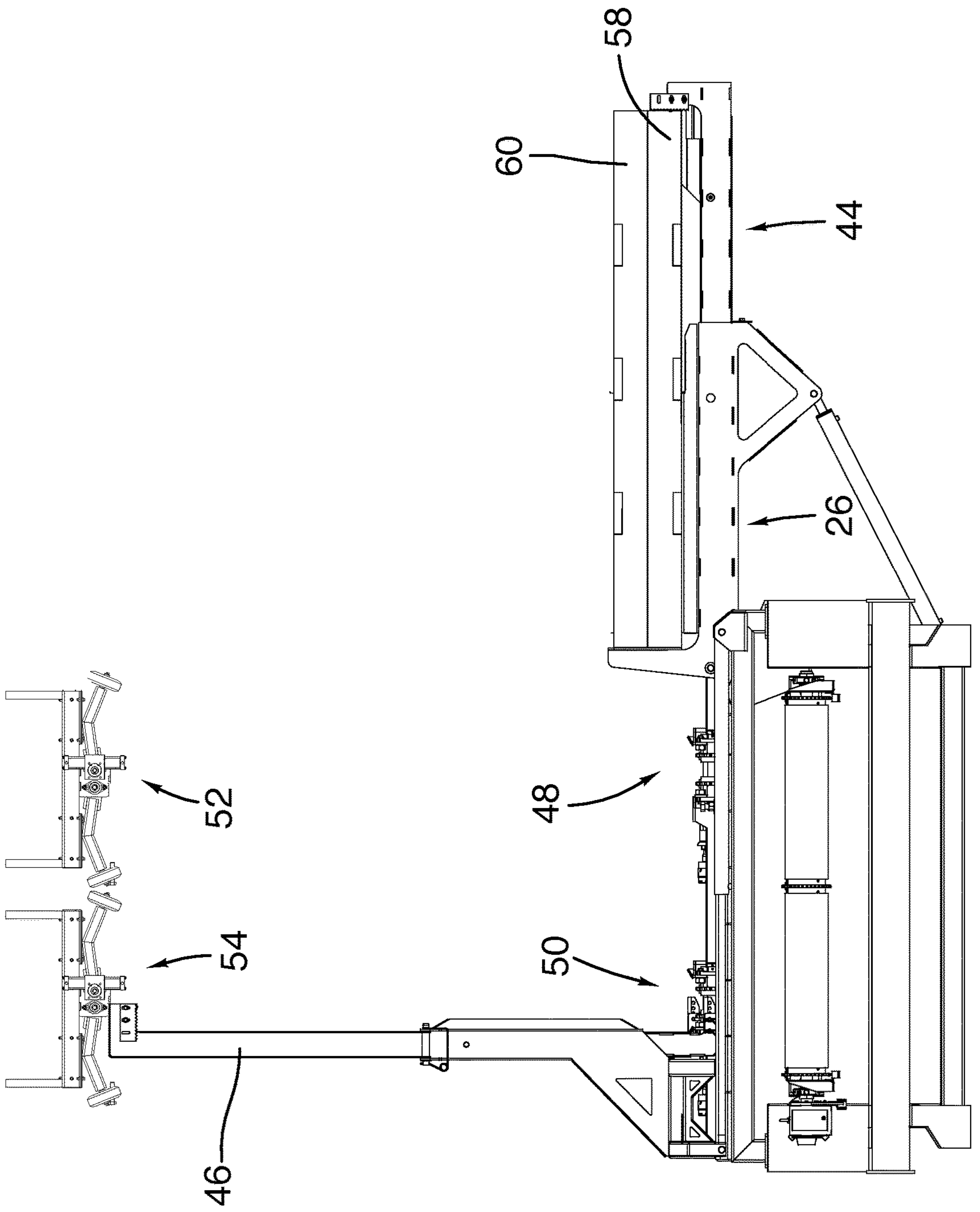
FIG. 31 is a view similar to FIG. 30, with the unloading platform at the lowered position and the clamp and the gripping position.
Figure 32:
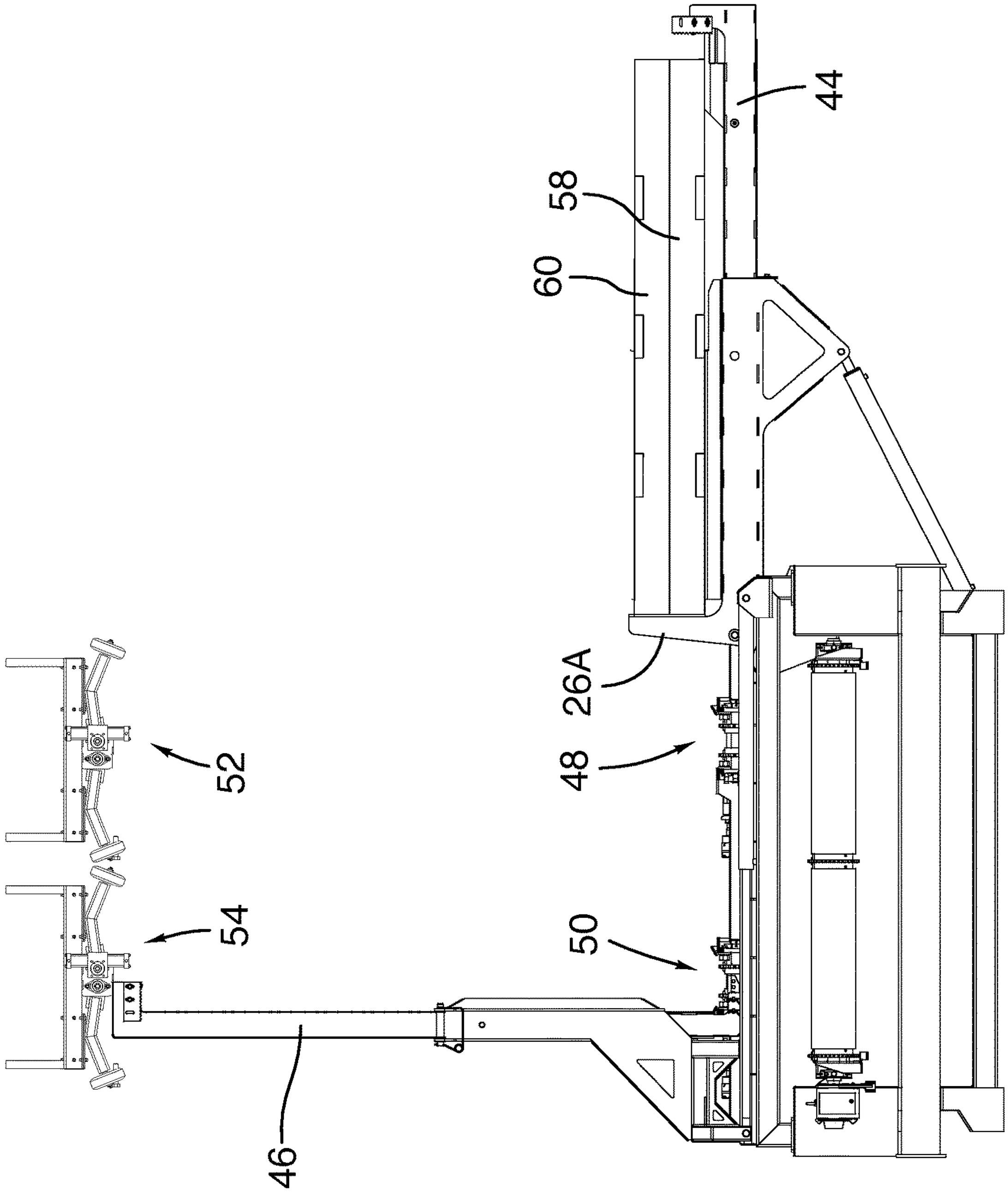
FIG. 32 is a view similar to FIG. 31, with the clamp at the release position.
Figure 33:
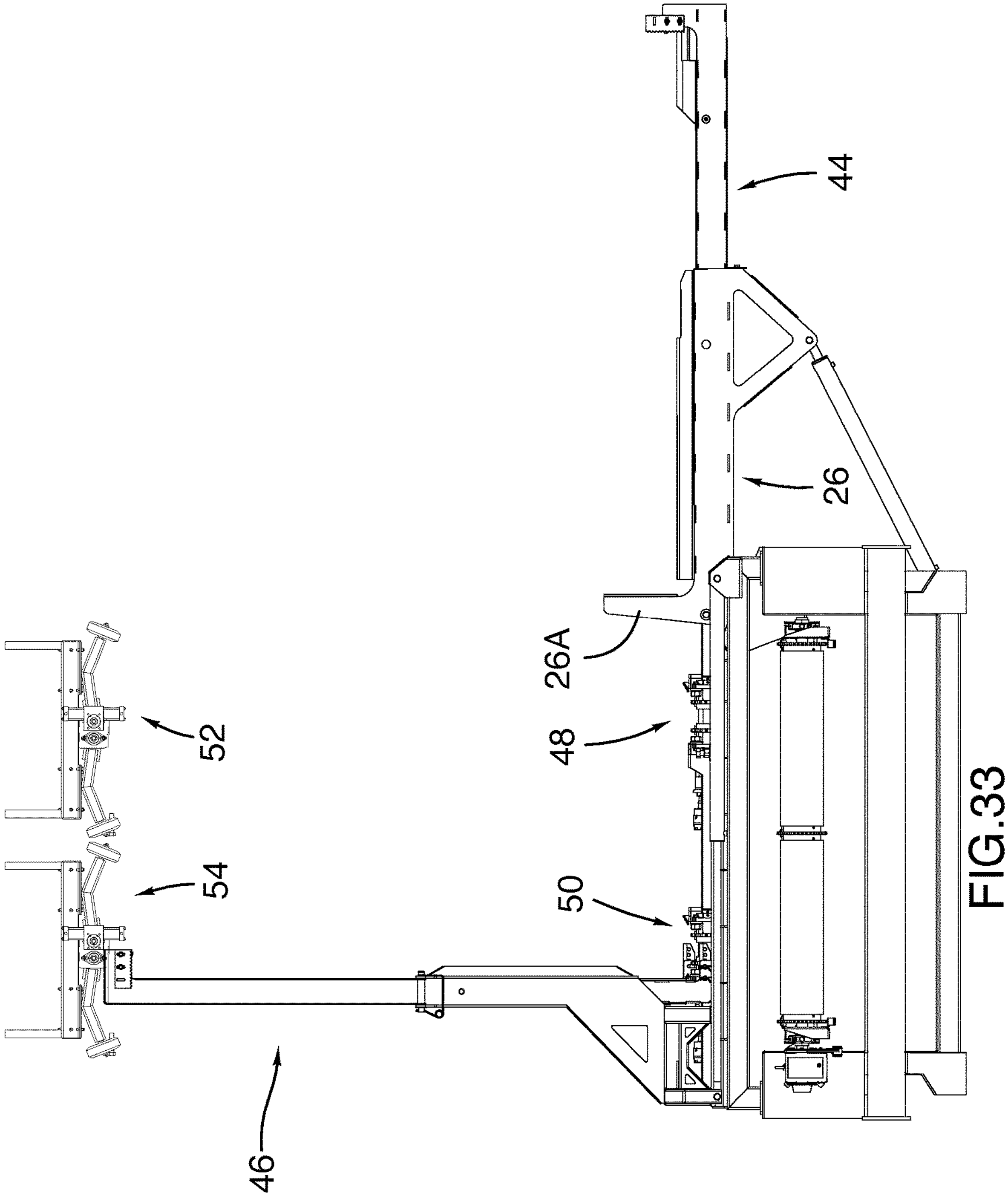
FIG. 33 is a view similar to FIG. 32, with the mats removed.

Thereafter: the shuttle is moved to the retracted, elevated position, as shown in FIG. 27, thereby to lock the other of the mats upright; the roller arrangements are moved to the retracted positions, as shown in FIG. 28; the shuttle is moved to the extended, raised position, as shown in FIG. 29, thereby abutting the mats against one another and subsequently to the extended, lowered position, shown in FIG. 30, whereat the other of the mats is deposited upon the unloading platform. This position of the mats will be understood to define a staging position of the mats. The unloading platform then pivots to the lowered position, in carriage of the mats, as shown in FIG. 31, and the clamp is moved to the release position, as shown by FIG. 32, thereby to permit the mats to be unloaded, for example, by a fork lift, leaving the platform empty, as indicated by FIG. 33.

Figure 42:
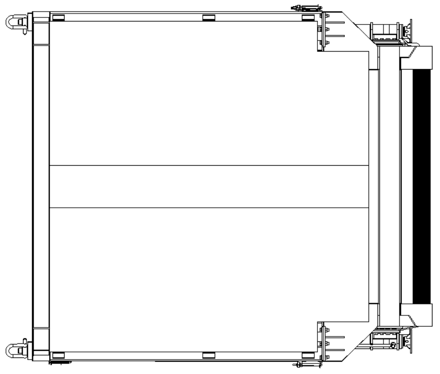
FIG. 42 is an end view of the structure of FIG. 41.
Figure 41:
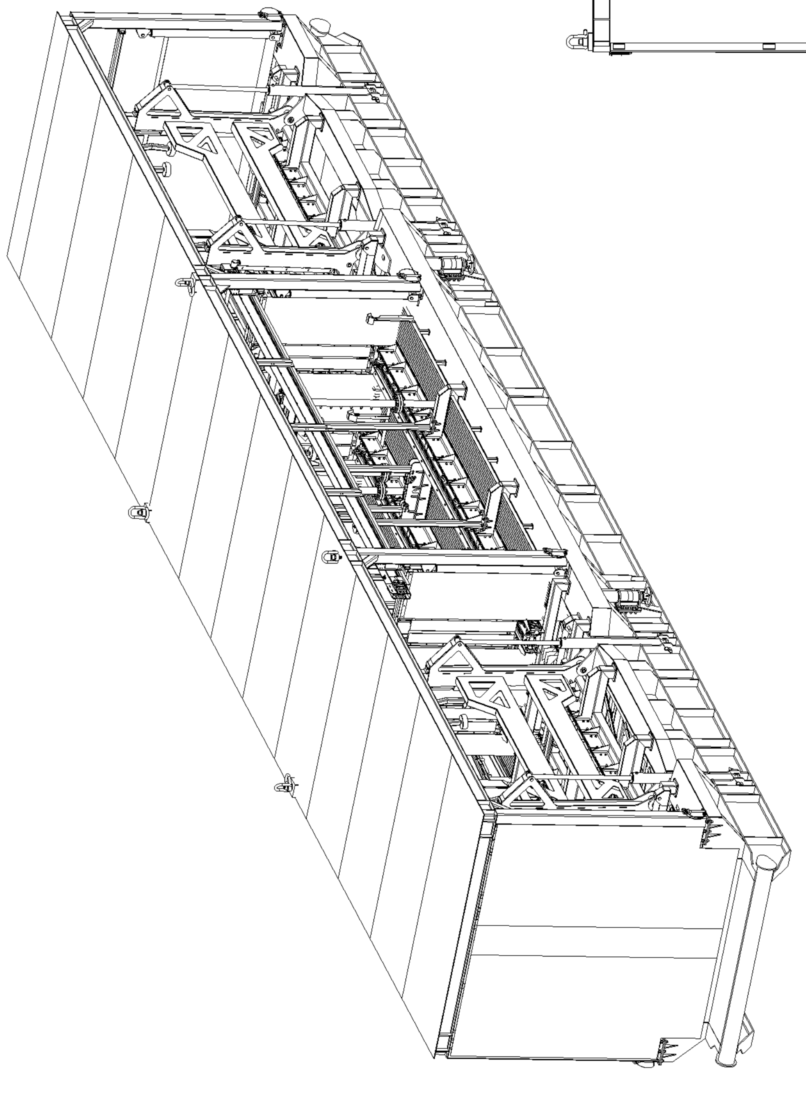
FIG. 41 is a view similar to FIG. 1 showing a transport configuration of the apparatus.
Figure 43:
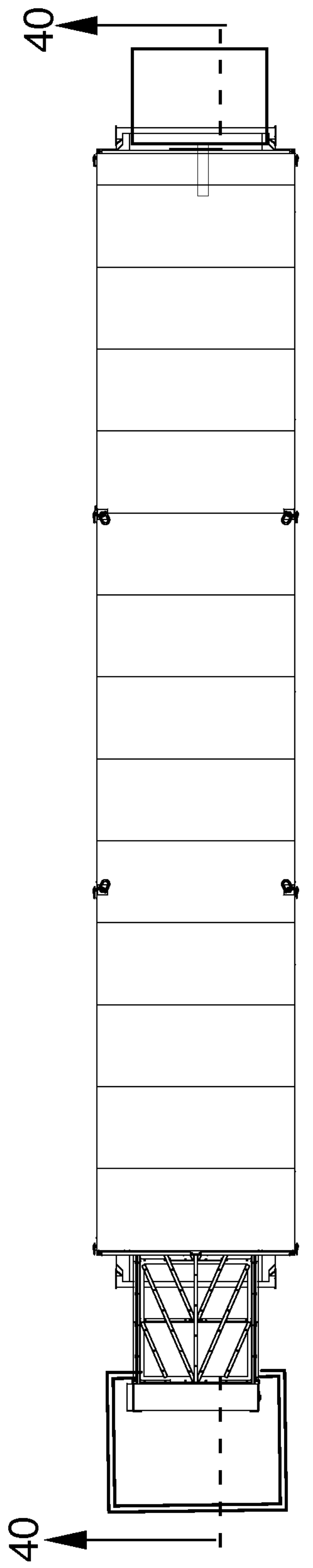
FIG. 43 is a plan view of the structure of FIG. 1.

Apparatus has a transport configuration shown, in FIGS. 41 and 42, wherein it has the dimensions of a standard shipping container and is thereby suitable for movement by container trailer or the like.

Apparatus is adapted for such configuration by means of, inter alia:

- joints provided in arms 42 and tubes 100
- segmented construction, with the roller arrangements 50, 52 and washing facility 34 being mounted to one part of the body and the mat conveyors and transporters being mounted to the other; and
- hydraulic cylinders for facilitating movement of the one part of the body relative to the other.

Figure 44:
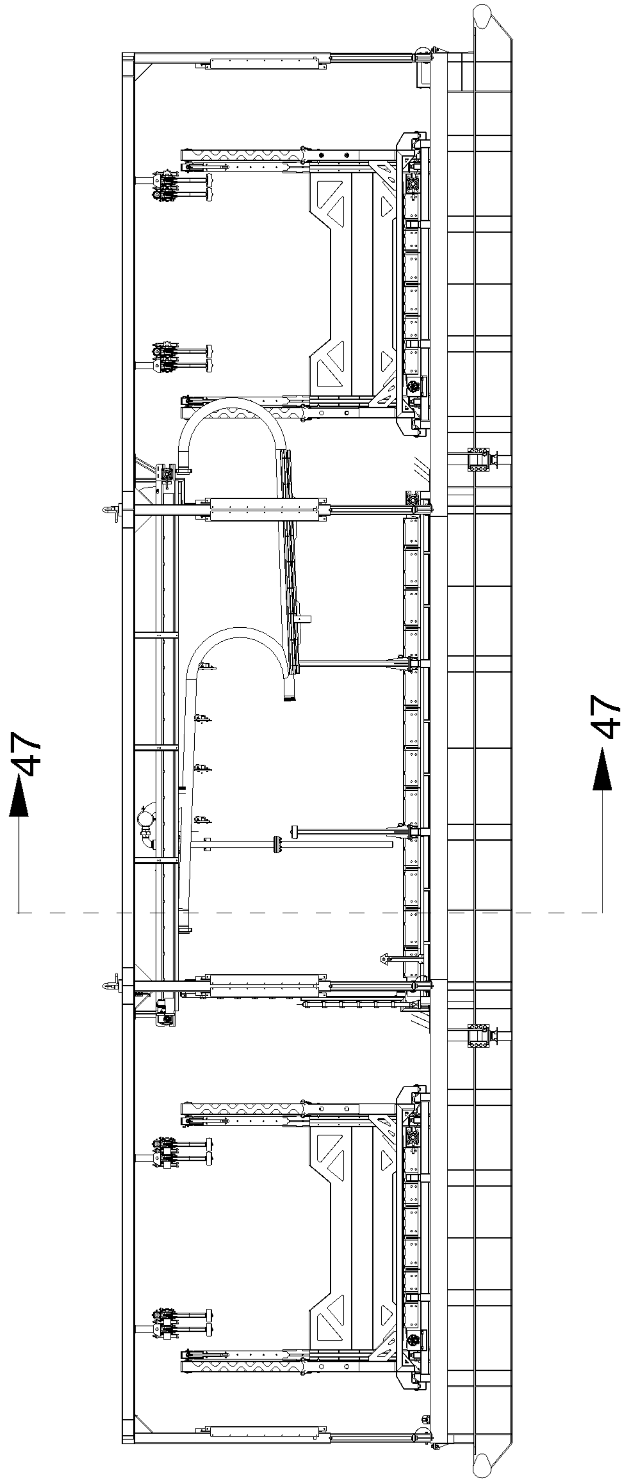
FIG. 44 is a view long section 44-44 of FIG. 43.
Figure 45:
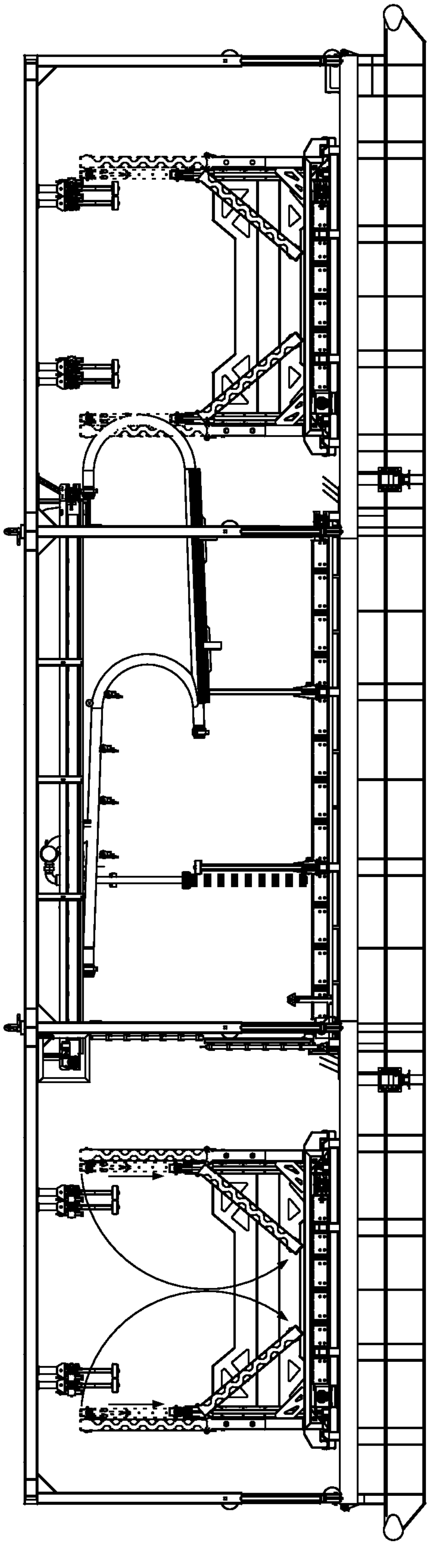
FIG. 45 is a view similar to FIG. 44 showing an intermediate configuration of the apparatus.
Figure 46:
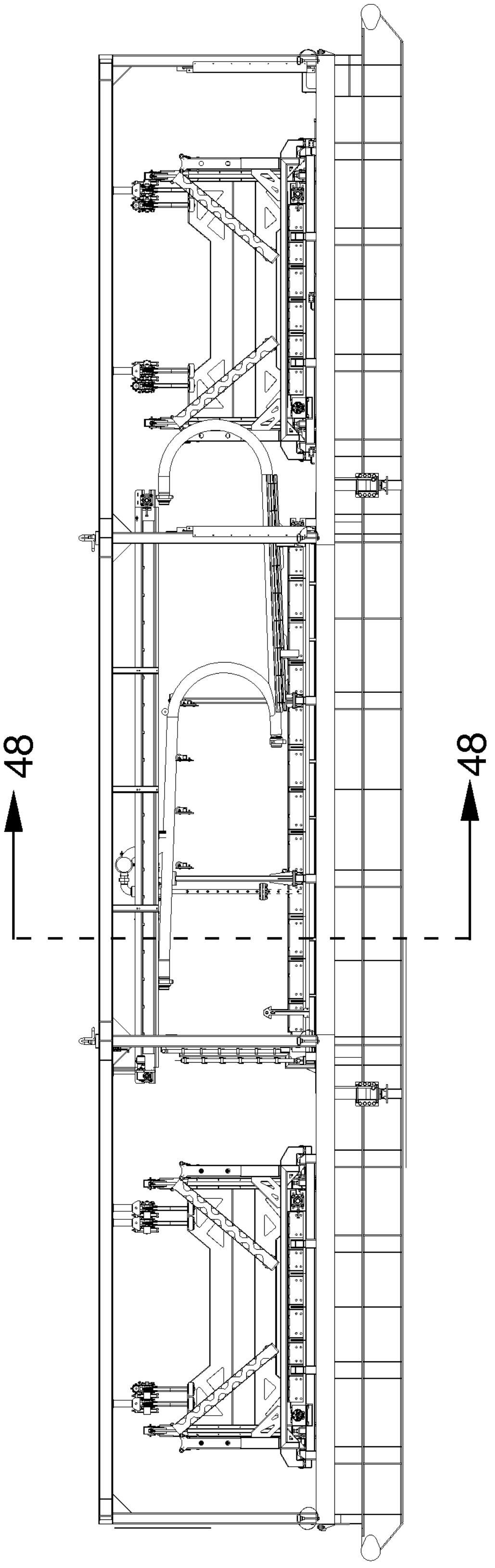
FIG. 46 is a view of the structure of FIG. 41 similar to FIG. 44.
Figure 47:
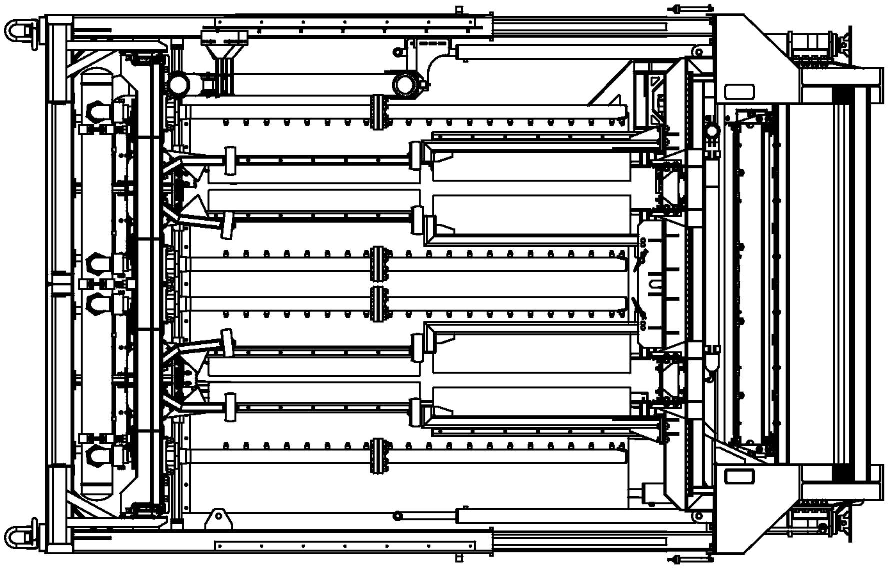
FIG. 47 is a view along section 47-47 of FIG. 44.
Figure 48:
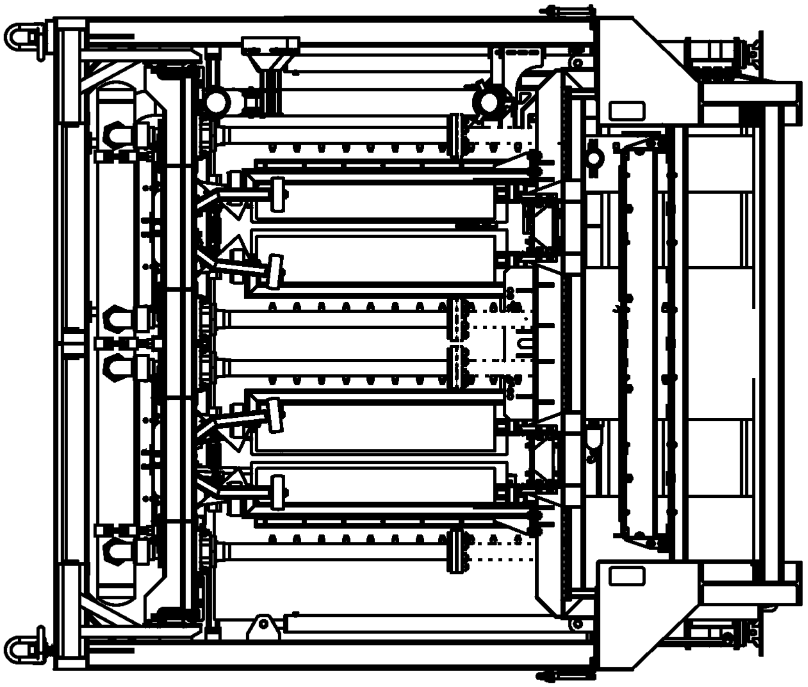
FIG. 48 is a view along section 48-48 of FIG. 46.

Assumption of the transport configuration is illustrated by FIGS. 44-46.

- FIG. 44 shows the apparatus after use has ceased and the conveyor has been stowed in the retracted positon;
- FIG. 45 shows arms 42 folded down and the lower segments of tubes have been removed;
- FIG. 46 shows the one part of the body lowered by cylinders towards the other.

Whereas a single embodiment is shown and described, variations are possible. Accordingly, the invention should be understood to be limited only by the accompanying claims, purposively construed.

The invention claimed is:

1. An apparatus for use with a pair of mats, the apparatus comprising:

a body adapted for highway transport;

a loading platform having a loading axis which extends longitudinally, the loading platform having:

(i) a lowered position whereat the loading platform projects horizontally from the loading axis and beyond the body to permit receipt of the pair of the mats, a first mat of the pair of mats being disposed upon the loading platform and a second mat of the pair of mats being disposed upon the first mat; and (ii) a raised position whereat the loading platform projects upwardly from the loading axis; and adapted to pivot about the loading axis from the lowered position of the loading platform to the raised position of the loading platform in carriage of the pair of mats, to, place the pair of mats at a transition position;

a splitter means adapted to move the second mat laterally away from the first mat, to orient the pair of mats at an entry position when the loading platform is in the raised position and the pair of mats is at the transition position;

a transporter means adapted to transport each of the mats of the pair of mats longitudinally relative to the body to an exit position when the pair of mats are at the entry position;

a uniter means adapted to move the second mat laterally towards the first mat, to orient the pair of mats at a staging position, when the mats are at the exit position;

an unloading platform having an unloading axis which extends longitudinally, the unloading platform having:

(i) a raised position whereat the unloading platform projects upwardly from the unloading axis and, when the pair of mats is at the staging position, the pair of mats is disposed against the unloading platform; and (ii) a lowered position whereat the unloading platform projects horizontally from the unloading axis and beyond the body; and being pivotable about the unloading axis from the raised position of the unloading platform to the lowered position of the unloading platform in carriage of the pair of mats, to, place the pair of mats at an unloading position whereat the first mat is disposed upon the unloading platform and the second mat is disposed upon the first mat; and a washing facility disposed between the loading and the unloading platforms and adapted to wash the pair of mats.

2. The apparatus of claim 1, wherein the splitter means comprises:

a gripper means associated with the loading platform which clamps t the first mat to the loading platform during movement of the pair of mats to the entry position; and a shuttle means which, when the pair of mats is at the transition position and the gripper means is engaged to t the first mat, provides for said movement of the second mat laterally away from the first mat.

3. The apparatus of claim 1, wherein the transporter means comprises:

for each of the mats of the pair of mats, a conveyor, the conveyor for the first mat being sized and positioned such that, upon movement of the pair of mats to the transition position, the first mat rests upon the conveyor and such that, upon movement of the pair of mats by the conveyor to the exit position; the first mat is disposed immediately above the unloading platform; and the conveyor for the second mat being sized and positioned such that, upon movement of the pair of mats to the entry position, the second mat rests upon the conveyor and such that, upon movement of the pair of mats by the conveyor to the staging position, the second mat is disposed immediately above the unloading platform.

4. The apparatus of claim 3, wherein the transporter means further comprises:

a roller arrangement provided for each mat of the pair of mats and stabilizing said each mat during movement of the pair of mats from the entry position to the exit position.

5. The apparatus of claim 4, wherein the roller arrangements collectively have an extended position associated with movement of the pair of mats from the entry position to the exit position, and a retracted position associated with movement of the pair of mats to the entry position from the exit position.

* * * * *